US010514955B2

(12) United States Patent
Wu

(10) Patent No.: US 10,514,955 B2
(45) Date of Patent: Dec. 24, 2019

(54) METHOD AND DEVICE FOR ALLOCATING CORE RESOURCES OF A MULTI-CORE CPU

(71) Applicant: NetEase (Hangzhou) Network Co., Ltd., Hangzhou (CN)

(72) Inventor: Yu Wu, Hangzhou (CN)

(73) Assignee: NETEASE (HANGZHOU) NETWORK CO., LTD., Hangzhou, Zhejiang Province (CN)

( * ) Notice: Subject to any disclaimer, the term of this patent is extended or adjusted under 35 U.S.C. 154(b) by 254 days.

(21) Appl. No.: 15/595,968

(22) Filed: May 16, 2017

(65) Prior Publication Data

US 2018/0095800 A1    Apr. 5, 2018

(30) Foreign Application Priority Data

Sep. 30, 2016    (CN) .......................... 2016 1 0873378

(51) Int. Cl.
*G06F 9/50* (2006.01)
*G06F 9/48* (2006.01)
*G06F 9/46* (2006.01)

(52) U.S. Cl.
CPC .......... *G06F 9/5038* (2013.01); *G06F 9/4831* (2013.01); *G06F 9/4881* (2013.01);
(Continued)

(58) Field of Classification Search
None
See application file for complete search history.

(56) References Cited

U.S. PATENT DOCUMENTS

| | | |
|---|---|---|
| 7,093,258 B1 | 8/2006 | Miller et al. |
| 2011/0219246 A1 | 9/2011 | Arai |
| 2015/0301864 A1* | 10/2015 | Tseng .................... G06F 9/5011 718/104 |

FOREIGN PATENT DOCUMENTS

| | | |
|---|---|---|
| CN | 102045199 A | 5/2011 |
| CN | 102591722 A | 7/2012 |

(Continued)

OTHER PUBLICATIONS

Bai,Xiuxiu et al., "A scalability prediction approach for multi-threaded applications on manycore processors", Journal Supercomputing (Nov. 30, 2015) 71:4072-4094.

(Continued)

*Primary Examiner* — Qing Yuan Wu
(74) *Attorney, Agent, or Firm* — Yunling Ren

(57) ABSTRACT

A method for allocating core resources of a multi-core CPU according to embodiments of the present disclosure, comprising: determining the number of time critical threads included in a focus process, wherein said focus process is created when a predetermined software is running; and allocating core resources for the time critical threads and making the allocated core resources dedicated to the time critical threads, based on the number of core resources included in the multi-core CPU and the number of the time critical threads, so as to maximize the number of the time critical threads that occupy exclusive core resources. In said method, it's desirable to try to allocate separate core resources for time critical threads included in a focus process, and said time critical threads can be locked within the correspondingly allocated core resources, so that the allocation of core resources can be more balanced. Accordingly, response speed and performance of a focus process can be improved, which allows a focus process to run in an optimal status, and thus bring better user experience. In addition, a device for allocating core resources of a multi-core CPU is also provided.

16 Claims, 12 Drawing Sheets

(52) U.S. Cl.
CPC .............. *G06F 9/4887* (2013.01); *G06F 9/50* (2013.01); *G06F 9/5077* (2013.01); *G06F 9/5083* (2013.01); *G06F 9/46* (2013.01)

(56) References Cited

FOREIGN PATENT DOCUMENTS

| | | |
|---|---|---|
| CN | 103617088 A | 3/2014 |
| CN | 103841196 A | 6/2014 |
| CN | 104504006 A | 4/2015 |
| EP | 1914632 A1 | 4/2008 |
| JP | 2012043232 A | 3/2012 |
| JP | 5786641 B2 | 9/2015 |

OTHER PUBLICATIONS

Sui, Junhua et al., "Overview of multicore multithread technologies", Journal of Computer Applications (Jun. 30, 2013) 33(S1): 239-242, 261.

Guan, Haiyang, "Research on Fetch Control Mechanism Based on Simultaneous Multithreading", China Excellent Master's Thesis Full-text Database, Information Technology Series (Mar. 15, 2013), 1370-20.

* cited by examiner

METHOD AND DEVICE FOR ALLOCATING CORE RESOURCES OF A MULTI-CORE CPU

CROSS-REFERENCE TO RELATED APPLICATIONS

This application claims priority to Chinese Patent Application No. 201610873378.1, filed on Sep. 30, 2016, the entire contents of which are incorporated herein by reference.

TECHNICAL FIELD

Embodiments of the present disclosure relate to computer technology, and in particular, relate to a system and method for allocating core resources of a multi-core CPU.

BACKGROUND

The purpose of this part is to provide background or context for embodiments of the present disclosure set forth in the claims. The description herein is not intended to be an admission of being a prior art.

With the development of computer technology, computer programs can have more and more functions and their implementations are more and more complicated, resulting in higher and higher requirements for computer's processing ability. A multi-core CPU has been developed to satisfy such requirements. Multiple cores of a multi-core CPU can run program instructions independently and respectively, so as to speed up the running of programs and provide a multi-tasking ability using the parallel computing ability.

Usually, a computer may run multiple software simultaneously, or run multiple instances of a software simultaneously, wherein the later means that a software is running with multiple copies or processes simultaneously. No matter multiple software or multiple instances are running, only one process of one software can act as a focus process, i.e., the current process on which a user can operate, e.g., using a keyboard and/or mouse. Meanwhile, processes other than the focus process are background processes (referred as "BGP"). As the focus process is a process on which a user is operating, it's typically desirable for the focus process to conduct most computations and provide fastest responses, thereby enhancing user experience.

Further, the focus process may include time critical threads (TCTs) that require a relatively faster response and background threads (BGTs) that do not require such a fast response. When a focus process is running, core resources should be allocated among both time critical threads and background threads. An advanced operating system typically adopts a preemptive process scheduling for allocating core resources. That is, scheduling thread on each core resource by an operating system. In another word, an operating system may decide which core resource will be used by a thread and how long such use will last.

In this way, time critical threads included in a focus process will perform preemption upon core resources. However, for a focus process consuming intensive resources, more operating resources are required by its time critical threads. Due to resource preemption, some of the core resources may be shared by multiple time critical threads while other core resources are remained unoccupied. An imbalanced core resource allocation among time critical threads may slow down response speed, as well as reduce the performance of a focus process, e.g., a focus process cannot run in an optimal status.

SUMMARY

Since a preemptive process scheduling is typically used by a modern operating system for allocating core resources, a focus process conventionally cannot occupy sufficient core resources, resulting in a slow response and a low performance.

Accordingly, it is troublesome that a focus process cannot run in an optimal status.

Therefore, it's quite desirable for an improved device and method for allocating core resources, so that a focus process can respond faster, perform better and run in an optimal status.

In the context, embodiments of the present disclosure aim to provide devices and methods for allocating core resources.

According to a first aspect of the present disclosure, a method for allocating core resources of a multi-core CPU is provided, comprising: determining the number of time critical threads included in a focus process, wherein said focus process is created when a predetermined software is running; and allocating core resources for the time critical threads and making the allocated core resources dedicated to the time critical threads, based on the number of core resources included in the multi-core CPU and the number of the time critical threads, so as to maximize the number of the time critical threads that occupy exclusive core resources.

In a first feasible implementation combined with the first aspect, said method further comprises: setting a priority of the focus process and the time critical threads included in the focus process higher than a normal priority.

In a second feasible implementation combined with the first aspect, the step of allocating core resources for the time critical threads and making the allocated core resources dedicated to the time critical threads based on the number of core resources included in the multi-core CPU and the number of the time critical threads so as to maximize the number of the time critical threads that occupy exclusive core resources comprises: comparing the number of physical core resources included in the multi-core CPU and the number of said time critical threads; in response to that the number of the physical core resources is no less than the number of the time critical threads, allocating the physical core resources for the time critical threads and making the allocated physical core resources dedicated to the time critical threads, so as to maximize the number of the time critical threads that occupy exclusive physical core resources; and in response to that the number of the physical core resources is less than the number of the time critical threads, allocating logical core resources included in the multi-core CPU for the time critical threads and making the allocated logical core resources dedicated to the time critical threads, based on the number of the logical core resources and the number of the time critical threads, so as to maximize the number of the time critical threads that occupy exclusive logical core resources.

In a third feasible implementation combined with the second feasible implementation of the first aspect, the step of in response to that the number of the physical core resources is no less than the number of the time critical threads, allocating the physical core resources for the time critical threads and making the physical core resources dedicated to the time critical threads comprises: in response to that the number of the physical core resources included in the multi-core CPU is more than the number of the time critical threads, allocating one physical core resource for each time critical thread and making the one physical core resource dedicated to each time critical thread, such that each time critical thread occupies exclusively one physical core resource respectively; and allocating remaining physical core resources of said multi-core CPU for background threads included in the focus process and making the physical core resources dedicated to the background threads, said background threads being different from the time critical threads and the remaining physical core resources are those included in the multi-core CPU but other than the physical core resources which have been allocated to the time critical threads.

In a fourth feasible implementation combined with the third feasible implementation of the first aspect, said method further comprises: setting a priority of the background threads higher than a normal priority.

In a fifth feasible implementation combined with the third feasible implementation of the first aspect, said method further comprises: allocating one predetermined physical core resource of the remaining physical core resources for all threads included in a background process and making the one predetermined physical core resource dedicated to the all threads included in the background process, wherein said background process is created when the predetermined software is running; and setting a priority of the background process and all threads included in the background process lower than a normal priority.

In a sixth feasible implementation combined with the second feasible implementation of the first aspect, the step of in response to that the number of the physical core resources is no less than the number of the time critical threads, allocating the physical core resources for the time critical threads and making the physical core resources dedicated to the time critical threads comprises: in response to that the number of the physical core resources is equal to the number of the time critical threads, allocating one physical core resource for each time critical thread respectively and making the one physical core resource dedicated to each time critical thread; allocating one predetermined physical core resource of said physical core resources for background threads included in the focus process and making the predetermined physical core resource dedicated to the background threads, wherein said background threads are different from the time critical threads; and wherein a first number of said time critical threads occupy exclusively one physical core resource respectively, and the first number is the number of the physical core resources minus one.

In a seventh feasible implementation combined with the sixth feasible implementation of the first aspect, said method further comprises: setting a priority of the background thread as a normal priority.

In an eighth feasible implementation combined with the sixth feasible implementation of the first aspect, said method further comprises: allocating one predetermined physical core resource for all threads included in a background process and making the one predetermined physical core resource dedicated to the all threads, wherein said background process is created while the predetermined software is running; and setting a priority of the background process and all threads included in the background process lower than a normal priority.

In a ninth feasible implementation combined with the second feasible implementation of the first aspect, the step of allocating logical core resources included in the multi-core CPU for the time critical threads and making the allocated logical core resources dedicated to the time critical threads, based on the number of the logical core resources and the number of the time critical threads, comprises: comparing the number of logical core resources included in the multi-core CPU and the number of said time critical threads; in response to that the number of the logical core resources is more than the number of the time critical threads, allocating one logical core resource for each time critical thread and making the allocated logical core resources dedicated to each time critical thread, such that each time critical thread occupies exclusively one logical core resource respectively; and allocating remaining logical core resources of said multi-core CPU for background threads included in the focus process and making the remaining logical core resources dedicated to the background threads, said background threads being different from the time critical threads, and the remaining logical core resources are those included in the multi-core CPU other than the logical core resources which have been allocated to the time critical threads.

In a tenth feasible implementation combined with the ninth feasible implementation of the first aspect, said method further comprises: setting a priority of the background threads higher than a normal priority.

In an eleventh feasible implementation combined with the ninth feasible implementation of the first aspect, said method further comprises: allocating one predetermined logical core resource of the remaining logical core resources for all threads included in a background process and making the one predetermined physical core resource dedicated to the all threads, wherein said background process is created when the predetermined software is running; and setting a priority of the background process and all threads included in the background process lower than a normal priority.

In a twelfth feasible implementation combined with the ninth feasible implementation of the first aspect, said method further comprises: in response to that the number of the logical core resources is equal to the number of the time critical threads, allocating one logical core resource for each time critical thread respectively and making the one logical core resource dedicated to each time critical thread; allocating one predetermined logical core resource of said logical core resources for background threads included in the focus process and making the one predetermined logical core resource dedicated to the background threads, said background threads being different from the time critical threads; and wherein a second number of the time critical threads occupy exclusively one logical core resource respectively, and the second number is the number of the logical core resources minus one.

In a thirteenth feasible implementation combined with the twelfth feasible implementation of the first aspect, said method further comprises: setting a priority of the background threads as a normal priority.

In a fourteenth feasible implementation combined with the twelfth feasible implementation of the first aspect, said method further comprises: allocating one predetermined logical core resource for all threads included in a background process and making the one predetermined logical core resource dedicated to the all threads, wherein said background process is created while the predetermined software is running; and setting a priority of the background process and all threads included in the background process lower than a normal priority.

In a fifteenth feasible implementation combined with the ninth feasible implementation of the first aspect, said method further comprises: in response to that the number of the logical core resources is less than the number of the time critical threads, allocating one logical core resource for each time critical thread and making the allocated logical core resources dedicated to each time critical thread, wherein the number of time critical threads that have been allocated with logical core resources equals to the number of the logical core resources; allocating one predetermined logical core resource of said logical core resources for both time critical threads that haven't been allocated any core resource and said background threads included in the focus process, and making the one predetermined logical core resource dedicated to both said time critical threads that haven't been allocated any core resource and said background threads included in the focus process, said background threads being different from the time critical threads; and wherein a second number of the time critical threads occupy exclusively one logical core resource respectively, and the second number is the number of the logical core resources minus one.

In a sixteenth feasible implementation combined with the fifteenth feasible implementation of the first aspect, said method further comprises: setting a priority of the background threads as a normal priority.

In a seventeenth feasible implementation combined with the fifteenth feasible implementation of the first aspect, said method further comprises: allocating one predetermined logical core resource for all threads included in a background process and making the one predetermined logical core resource dedicated to the all threads included in said background process, wherein said background process is created when the predetermined software is running; and setting a priority of the background process and all threads included in the background process lower than a normal priority.

In an eighteenth feasible implementation combined with the third feasible implementation of the first aspect, or the sixth feasible implementation of the first aspect, or the ninth feasible implementation of the first aspect, or the twelfth feasible implementation of the first aspect, or the fifteenth feasible implementation of the first aspect, said method further comprises: setting the background process into a dormant state when a predetermined software is running; and setting a priority of said background process lower than a normal priority.

In an nineteenth feasible implementation combined with the first aspect, in response to a focus process switching instruction, said method further comprises: determining the number of time critical threads included in the current focus process after switched; allocating core resources for the time critical threads, based on the number of core resources included in the multi-core CPU and the number of the time critical threads included in the current focus process, so as to maximize the number of the time critical threads that occupy exclusive core resources.

In a twentieth feasible implementation combined with the nineteenth feasible implementation of the first aspect, said method further comprises: setting a priority of the current focus process and the time critical threads included in the current focus process higher than a normal priority.

In a twenty-first feasible implementation combined with the nineteenth feasible implementation of the first aspect, said method further comprises: for the first background process, which is a background process degraded from a focus process based on said focus process switching instruction, allocating core resources for the time critical threads included in the first background process based on the result of allocating core resources for time critical threads included in the current focus process.

In a twenty-second feasible implementation combined with the twenty-first feasible implementation of the first aspect, said method further comprises: setting a priority of the first background process and the time critical threads included in the first background process lower than a normal priority.

In a twenty-third feasible implementation combined with the nineteenth feasible implementation of the first aspect, said method further comprises: setting the first background process into a dormant state; and setting a priority of said first background processes lower than a normal priority.

According to a second aspect of the present disclosure, a device for allocating core resources of a multi-core CPU is provided, comprising: a determining module for determining the number of time critical threads included in a focus process, wherein said focus process is created when a predetermined software is running; a resource allocating module for allocating the core resources for the time critical threads and making the core resources dedicated to the time critical threads, based on the number of core resources included in the multi-core CPU and the number of the time critical threads, so as to maximize the number of the time critical threads that occupy exclusive core resources.

In a first feasible implementation combined with the second aspect, said device further comprises: a priority-setting module configured to set a priority of the focus process and the time critical threads included in the focus process higher than a normal priority.

In a second feasible implementation combined with the second aspect, said resource allocating module is configured to: compare the number of physical core resources included in the multi-core CPU and the number of said time critical threads; in response to that the number of the physical core resources is no less than the number of the time critical threads, allocating the physical core resources for the time critical threads and making the allocated physical core resources dedicated to the time critical threads, so as to maximize the number of the time critical threads that occupy exclusive physical core resources; and in response to that the number of the physical core resources is less than the number of the time critical threads, allocate logical core resources included in the multi-core CPU for the time critical threads and make the allocated logical core resources dedicated to the time critical threads, based on the number of the logical core resources and the number of the time critical threads, so as to maximize the number of the time critical threads that occupy exclusive logical core resources.

In a third feasible implementation combined with the second feasible implementation of the second aspect, said resource allocating module is configured to: in response to that the number of the physical core resources included in the multi-core CPU is more than the number of the time critical threads, allocate one physical core resource for each time critical thread and make the one physical core resource dedicated to each time critical thread, such that each time critical thread occupies exclusively one physical core resource respectively; and allocate remaining physical core resources of said multi-core CPU for background threads included in the focus process and make the physical core resources dedicated to the background threads, said background threads being different from the time critical threads and the remaining physical core resources are those included in the multi-core CPU but other than the physical core resources which have been allocated to the time critical threads.

In a fourth feasible implementation combined with the third feasible implementation of the second aspect, said device further comprises: a priority setting module configured to set a priority of the background threads higher than a normal priority.

In a fifth feasible implementation combined with the third feasible implementation of the second aspect, said device further comprises: a priority setting module; said resource allocating module is configured to allocate one predetermined physical core resource of the remaining physical core resources for all threads included in a background process and make the one predetermined physical core resource dedicated to the all threads included in the background process, wherein said background process is created when the predetermined software is running; said priority setting module is configured to set a priority of the background process and all threads included in the background process lower than a normal priority.

In a sixth feasible implementation combined with the second feasible implementation of the second aspect, said resource allocating module is configured to in response to that the number of the physical core resources is equal to the number of the time critical threads, allocate one physical core resource for each time critical thread respectively and make the one physical core resource dedicated to each time critical thread; allocate one predetermined physical core resource of said physical core resources for background threads included in the focus process and make the predetermined physical core resource dedicated to the background threads, wherein said background threads are different from the time critical threads; and wherein a first number of said time critical threads occupy exclusively one physical core resource respectively, and the first number is the number of the physical core resources minus one.

In a seventh feasible implementation combined with the sixth feasible implementation of the second aspect, said device further comprises: a priority setting module configured to set a priority of the background threads as a normal priority.

In an eighth feasible implementation combined with the seventh feasible implementation of the second aspect, said device further comprises: a priority setting module; said resource allocating module is configured to allocate one predetermined physical core resource for all threads included in a background process and make the one predetermined physical core resource dedicated to the all threads, wherein said background process is created while the predetermined software is running; and said priority setting module is configured to set a priority of the background process and all threads included in the background process lower than a normal priority.

In a ninth feasible implementation combined with the second feasible implementation of the second aspect, said resource allocating module is configured to compare the number of logical core resources included in the multi-core CPU and the number of said time critical threads; in response to that the number of the logical core resources is more than the number of the time critical threads, allocate one logical core resource for each time critical thread and make the allocated logical core resources dedicated to each time critical thread, such that each time critical thread occupies exclusively one logical core resource respectively; and allocate remaining logical core resources of said multi-core CPU for background threads included in the focus process and make the remaining logical core resources dedicated to the background threads, said background threads being different from the time critical threads, and the remaining logical core resources are those included in the multi-core CPU other than the logical core resources which have been allocated to the time critical threads.

In a tenth feasible implementation combined with the ninth feasible implementation of the second aspect, said method further comprises: a priority setting module configured to set a priority of the background threads higher than a normal priority.

In an eleventh feasible implementation combined with the ninth feasible implementation of the second aspect, said device further comprises: a priority setting module; said resource allocating module is configured to allocate one predetermined logical core resource of the remaining logical core resources for all threads included in a background process and make the one predetermined physical core resource dedicated to the all threads, wherein said background process is created when the predetermined software is running; and said priority setting module is configured to set priority of the background process and all threads included in the background process lower than a normal priority.

In a twelfth feasible implementation combined with the ninth feasible implementation of the second aspect, said resource allocating module is configured to: in response to that the number of the logical core resources is equal to the number of the time critical threads, allocate one logical core resource for each time critical thread respectively and make the one logical core resource dedicated to each time critical thread; allocate one predetermined logical core resource of said logical core resources for background threads included in the focus process and make the one predetermined logical core resource dedicated to the background threads, said background threads being different from the time critical threads; and wherein a second number of the time critical threads occupy exclusively one logical core resource respectively, and the second number is the number of the logical core resources minus one.

In a thirteenth feasible implementation combined with the twelfth feasible implementation of the second aspect, said device further comprises: a priority setting module, configured to set a priority of the background threads as a normal priority.

In a fourteenth feasible implementation combined with the twelfth feasible implementation of the second aspect, said device further comprises: a priority setting module; said resource allocating module is configured to allocate one predetermined logical core resource for all threads included in a background process and making the one predetermined logical core resource dedicated to the all threads, wherein said background process is created while the predetermined software is running; and said priority setting module is configured to set a priority of the background process and all threads included in the background process lower than a normal priority.

In a fifteenth feasible implementation combined with the ninth feasible implementation of the second aspect, said resource allocating module is further configured to in response to that the number of the logical core resources is less than the number of the time critical threads, allocate one logical core resource for each time critical thread and making the allocated logical core resources dedicated to each time critical thread, wherein the number of time critical threads that have been allocated with logical core resources equals to the number of the logical core resources; allocate one predetermined logical core resource of said logical core resources for both time critical threads that haven't been allocated any core resource and said background threads included in the focus process, and make the one predetermined logical core resource dedicated to both said time critical threads that haven't been allocated any core resource and said background threads included in the focus process, said background threads being different from the time critical threads; and wherein a second number of the time critical threads occupy exclusively one logical core resource respectively, and the second number is the number of the logical core resources minus one.

In a sixteenth feasible implementation combined with the fifteenth feasible implementation of the second aspect, said device further comprises: a priority setting module, configured to set a priority of the background threads as a normal priority.

In a seventeenth feasible implementation combined with the fifteenth feasible implementation of the second aspect, the resource allocating module is further configured to allocate one predetermined logical core resource for all threads included in a background process and make the one predetermined logical core resource dedicated to the all threads included in said background process, wherein said background process is created when the predetermined software is running; and said priority setting module is configured to set a priority of the background process and the all threads included in the background process lower than a normal priority.

In an eighteenth feasible implementation combined with the third feasible implementation of the second aspect, or the sixth feasible implementation of the second aspect, or the ninth feasible implementation of the second aspect, or the twelfth feasible implementation of the second aspect, or the fifteenth feasible implementation of the second aspect, said device further comprises: a dormancy setting module and a priority setting module; said dormancy setting module is configured to set the background process into a sleep state when a predetermined software is running; and said priority setting module is configured to set a priority of said background process lower than a normal priority.

In a nineteenth implementation combined with the second aspect, said determining module is further configured to, in response to a focus process switching instruction, determine the number of time critical threads included in the current focus process after switched; said resource allocating module is configured to allocate core resources for the time critical threads, based on the number of core resources included in the multi-core CPU and the number of the time critical threads included in the current focus process, so as to maximize the number of the time critical threads that occupy exclusive core resources.

In a twentieth feasible implementation combined with the nineteenth feasible implementation of the second aspect, said device further comprises: a priority setting module; said priority setting module is configured to set a priority of the current focus process and the time critical threads included in the current focus process higher than a normal priority.

In a twenty-first feasible implementation combined with the nineteenth feasible implementation of the second aspect, for the first background process which is a background process degraded from a focus process based on said focus process switching instruction, said resource allocating module is further configured to allocate core resources for the time critical threads included in the first background process based on the result of allocating core resources for time critical threads included in the current focus process.

In a twenty-second feasible implementation combined with the twenty-first feasible implementation of the second aspect, said device further comprises: a priority setting module, configured to set a priority of the first background process and the time critical threads included in the first background process lower than a normal priority.

In a twenty-third feasible implementation combined with the nineteenth feasible implementation of the second aspect, said device further comprises: a dormancy setting module and a priority setting module; said dormancy setting module is configured to set the first background process into a dormant state; and said priority setting module is configured to set a priority of said first background process lower than a normal priority.

The method and device for allocating core resources of a multi-core CPU according to embodiments of the present disclosure, comprising: determining the number of time critical threads included in a focus process, wherein said focus process is created when a predetermined software is running; and allocating core resources for the time critical threads and making the allocated core resources dedicated to the time critical threads, based on the number of core resources included in the multi-core CPU and the number of the time critical threads, so as to maximize the number of the time critical threads that occupy exclusive core resources.

In this way, separate core resources are allocated for time critical threads included in a focus process, and said time critical threads can be locked within the correspondingly allocated core resources, so as to maximize the number of time critical threads that occupy exclusive core resources. Compared to conventional technical solutions where time critical threads obtain core resources by a resource preemption scheduling, the embodiments according to the present disclosure can maximize the usage of core resources and minimize resource preemption among time critical threads, so that the allocation of core resources is more balanced. Accordingly, response speed and performance of a focus process can be improved, which allows a focus process to run in an optimal status, and thus optimizing user experience.

BRIEF DESCRIPTION OF THE DRAWINGS

The above and other purposes, features and advantages of the exemplary embodiments of the present disclosure will be readily understood by referring the drawings and reading the following detailed description. In the drawings, several embodiments of the present disclosure are shown in a way of example but not limitation, wherein.

In the accompanying drawings, same or corresponding reference numbers indicate same or corresponding parts.

DETAILED DESCRIPTION OF THE EMBODIMENTS

Figure 1:
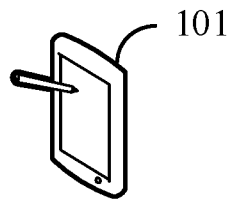
FIG. 1 is schematic diagram exemplarily illustrating an application scenario according to an embodiment of the present disclosure.

The principle and spirit of the present invention will be described below with reference to a number of exemplary embodiments. It is to be understood that, these embodiments are provided solely to enable those skilled in the art to better understand the invention, and thus to implement the invention, rather than being used as limitations to the scope of the invention. Rather, these embodiments are provided so that this disclosure will be thorough and complete, and will fully convey the scope of the disclosure to those skilled in the art.

It can be appreciated by a person skilled in the art that, embodiments of the present invention can be embodied as a system, an apparatus, a device, a method or a computer program product. Therefore, the disclosure can be specifically implemented in hardware, software (including firmware, resident software, microcode etc.) or a combination thereof.

According to embodiments of the present invention, a method and device for allocating core resources of a multi-core CPU is provided.

It should be understood that, terms used herein have the following meanings:

1. Focus Process (FP): a process/copy of software on which a user currently focuses.

2. Time Critical Thread (TCT): a thread that is critical to response time.

3. Multi-core CPU: a multi-core processor, also known as a multi-core microprocessor, used for adding two or more independent physical central processing units (i.e. Cores) into a single computing component. These cores can run program instructions independently, thereby using the ability of parallel computing to accelerate running speed of a program and to provide multi-tasking capabilities. A processor with merely two cores is known as a dual-core processor. In addition, cores used herein may refer to a physical core or a logical core.

4. Locking: locking into cores of a multi-core CPU. That is, the technology of making one or several core of a multi-core CPU dedicated to one or more threads. At present, Windows, Linux and other modern operating systems have already been supporting said technology.

5. Physical Core: a hardware running unit in a multi-core or single-core CPU.

6. Logical Core: an abstract running unit in an operating system, and an operating system thread can run independently and concurrently on each single logical core resource. In a modern CPU design, a physical core resource can have multiple logical core resources. For example, both the Hyper-Thread Technology from Intel and the Module-Core Architecture from AMD can implement multiple logical core resources on a same physical core resource.

7. Background Thread (BGT): a thread that is not critical to response time.

8. Background Process (BGP): a process/copy of software on which a user does not currently focus.

In addition, the number of any elements in the figures are merely exemplary, rather than limiting; and names are used for distinguishing only, no restriction shall be made to the meaning of the names.

The principle and spirit of present invention will be stated in detail with reference to several embodiments of the present invention.

Overview

The inventor found that, a preemptive process scheduling for allocating core resources is typically used in prior art, and resource preemption will occur among time critical threads included in a focus process. For a focus process consuming intensive resources, more operating resources are required by its time critical threads. Due to resource preemption, an imbalanced core resource allocation among time critical threads would occur, which may slow down response speed, as well as reduce the performance of a focus process, so that a focus process cannot run in an optimal status. Therefore, in prior art, it is not available for an improved method of allocating core resources so as to optimize the running status of a focus process.

Therefore, a method and device for allocating core resources of a multi-core CPU is provided. The process for allocating core resources comprising: determining the number of time critical threads included in a focus process, wherein said focus process is created when a predetermined software is running; and allocating core resources for the time critical threads and making the allocated core resources dedicated to the time critical threads, based on the number of core resources included in the multi-core CPU and the number of the time critical threads, so as to maximize the number of the time critical threads that occupy exclusive core resources.

After basic principle of the present invention is introduced, various exemplary embodiments will be introduced below in details.

Application Scenario

First refer to FIG. 1, a terminal 101 can support a CPU having multiple physical core resources or multiple logical core resources. Furthermore, the terminal 101 can also support a CPU core locking technology. The terminal 101 can run a number of software. Further, the terminal 101 can also run a number of instances of one software, that is, a same software initiates multiple copies or processes at the same time. The terminal 101 can be a portable device (e.g. a mobile phone, a tablet, a laptop, etc.) or a personal computer (a PC).

Exemplary Method

According to embodiments of the present invention, a method for allocating core resources of a multi-core CPU is described with reference to FIGS. 2-10, in combination with the application scenario of FIG. 1. It shall be noted that, the above-described application scenario is shown only for the purpose of understanding the spirit and principle of the present invention, and embodiments of the present invention are not limited in this respect. Rather, embodiments of the present invention may be applied to any of suitable applicable scenarios.

Figure 2:
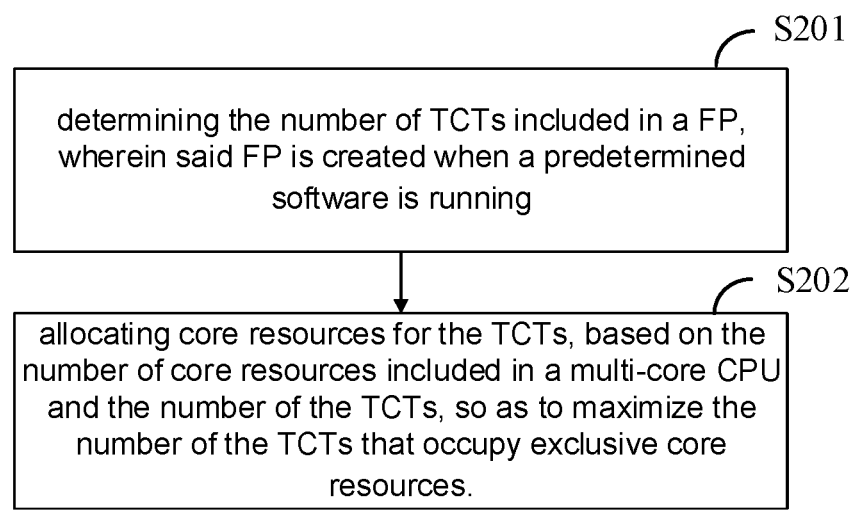
FIG. 2 is a flow diagram exemplarily illustrating a method for allocating core resources of a multi-core CPU according to an embodiment of the present disclosure.

FIG. 2 is a flow diagram illustrating a method for allocating core resources of a multi-core CPU according to one embodiment of the present invention. An executing subject may be the terminal 101 in the Application Scenario. A flow process for allocating core resources of a multi-core CPU provided by one embodiment of the present invention is described hereinafter with reference to FIG. 2.

As illustrated in FIG. 2, a method for allocating core resources of a multi-core CPU provided by an embodiment of the present application, comprising:

At S201, determining the number of time critical threads included in a focus process, wherein said focus process is created when a predetermined software is running.

At S202, allocating core resources for the time critical threads and making the allocated core resources dedicated to the time critical threads, based on the number of core resources included in the multi-core CPU and the number of the time critical threads as determined at S201, so as to maximize the number of the time critical threads that occupy exclusive core resources.

In an embodiment of the present invention, the number of time critical threads included in a current focus process is determined at first, and core resources of a multi-core CPU for the time critical threads are then allocated based on the number of core resources included the multi-core CPU. The allocation of core resources can follow the principle set forth below: try to make core resources of a multi-core CPU being respectively and exclusively possessed by as many time critical threads as possible. Then locking time critical threads within the allocated core resources. That is, limiting time critical threads to run on correspondingly allocated core resources.

As a result, even if an operating system schedules threads that run on core resources, the following situations would not occur: some core resources are shared by multiple time critical threads, and some core resources are unoccupied. Accordingly, the allocation of core resources between time critical threads can be balanced as much as possible, and a CPU can be utilized as far as possible. In addition, more handling capacity and faster response time can be achieved, and performance of a CPU can be enhanced to reach an optimized running status for a focus process.

Figure 3:
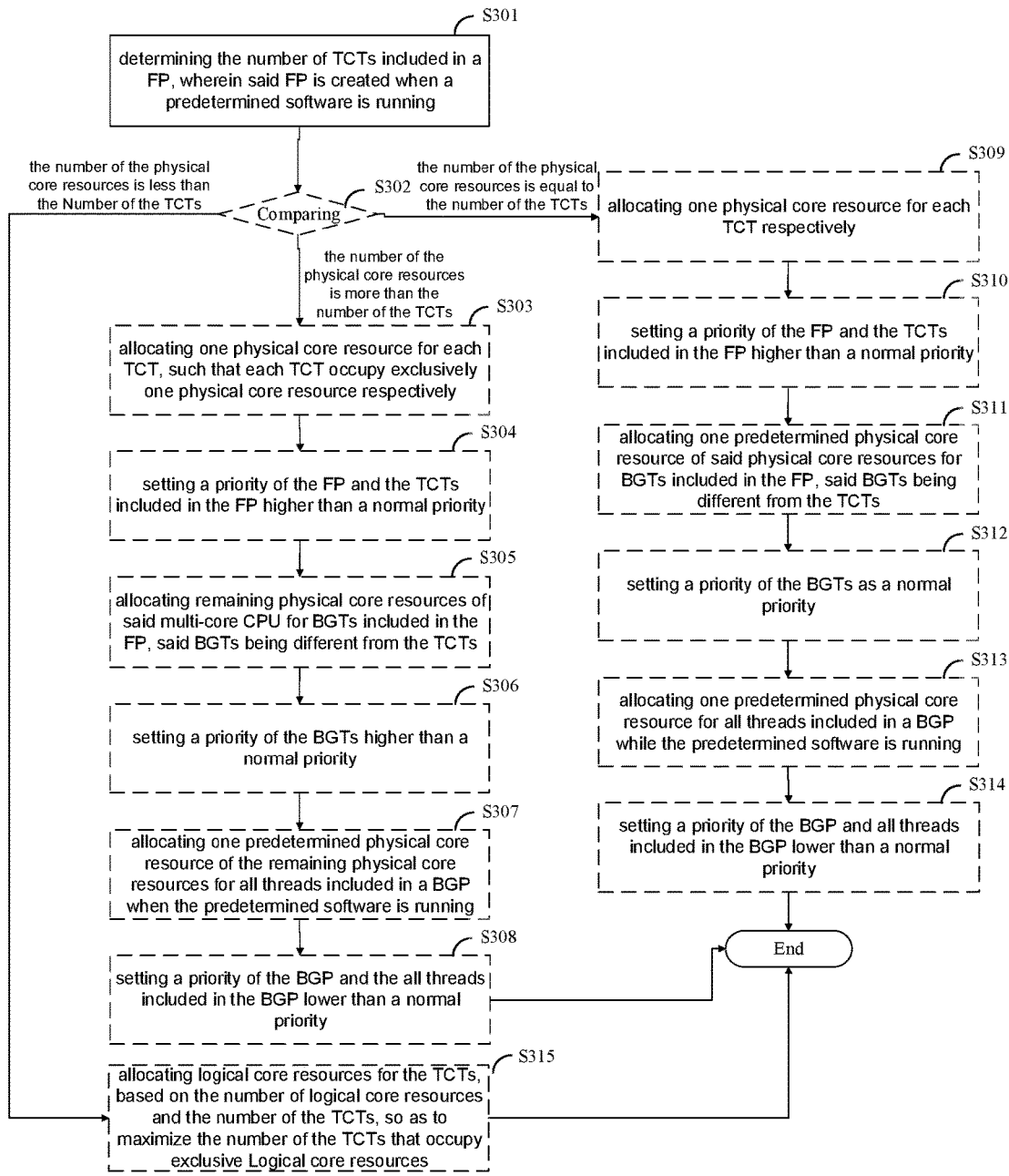
FIG. 3 is a flow diagram exemplarily illustrating a method for allocating core resources of a multi-core CPU according to another embodiment of the present technical disclosure.

FIG. 3 is a flow diagram illustrating a method for allocating core resources of a multi-core CPU according to another embodiment of the present invention. In this embodiment, in response to that the number of physical core resources is no less than the number of time critical threads, allocating the physical core resources for the time critical threads. An executing subject may be the terminal 101 in the Application Scenario. A flow process for allocating core resources of a multi-core CPU provided by one embodiment of the present invention is described hereinafter with reference to FIG. 3.

As illustrated in FIG. 3, a method for allocating core resources of a multi-core CPU provided by an embodiment of the present application, comprising:

At S301, determining the number of time critical threads included in a focus process, wherein said focus process is created when a predetermined software is running.

At S302, comparing the number of physical core resources included in the multi-core CPU and the number of said time critical threads determined at S301. If the number of the physical core resources is more than the number of the time critical threads, proceed to S303; if the number of the physical core resources is equal to the number of the time critical threads, proceed to step S309; and if the number of the physical core resources is less than the number of the time critical threads, proceed to step S315.

In such embodiment, in response to that the number of physical core resources is no less than the number of time critical threads, performing steps S303-S314. That is, allocating physical core resources for time critical threads and making the allocated physical core resources dedicated to the time critical threads, so as to maximize the number of the time critical threads that occupy exclusive physical core resources.

In response to that the number of physical core resources is less than the number of time critical threads, performing step S315. That is, allocating logical core resources included in a multi-core CPU for time critical threads and making the allocated logical core resources dedicated to the time critical threads, based on the number of the logical core resources and the number of the time critical threads, so as to maximize the number of the time critical threads that occupy exclusive logical core resources.

In such an embodiment, due to that logical core resources on a same physical core resource generally share a part of computer resources, processes/threads of a program that run on different logical core resources of a same physical core resource may affect each other. Therefore, it is preferred to allow all time critical threads have exclusive physical core resources, when the number of physical core resources in a multi-core CPU is sufficient. As such, when time critical threads occupying exclusive physical core resources are sufficiently isolated, each time critical thread can obtain more abundant resources and thus achieve a better optimization.

In response to that the number of physical core resources is more than the number of time critical threads, performing the following steps:

At S303, allocating one physical core resource for each time critical thread and making the allocated one physical core resource dedicated to each time critical thread, such that each time critical thread occupies exclusively one physical core resource respectively.

At S304, setting a priority of the focus process and the time critical threads included in the focus process higher than a normal priority.

In the step of setting a priority of the focus process and the time critical threads included in the focus process higher than a normal priority, the possibility of swapping out the time critical threads having a higher priority can be reduced, when an operating system conducts thread scheduling regarding core resources within which time critical threads are locked. Furthermore, even if the time critical threads having a higher priority are swapped out, the possibility of swapping in can be increased, so as to achieve a better optimization.

At S305, allocating remaining physical core resources of said multi-core CPU for background threads included in the focus process and making the physical core resources dedicated to the background threads, said background threads being different from the time critical threads and the remaining physical core resources are those included in the multi-core CPU but other than the physical core resources which have been allocated to the time critical threads.

When specifically implemented in aforesaid step, the allocation can be conducted according to the number of remaining physical core resources. If the number of remaining physical core resources is no less than the number of background threads, each background thread can occupy one exclusive physical core resource respectively; if the number of remaining physical core resources is less than the number of background threads, the background threads can share the remaining physical core resources. No limitation shall be made to the specific allocating manner.

At S306, setting a priority of the background threads at S305 higher than a normal priority.

In such step, due to that the number of physical core resources is more than the number of time critical threads, each time critical thread can exclusively occupy corresponding physical core resources, and there are some physical core resources left. The remaining physical core resources can be allocated for background threads included in a focus process, wherein the background threads are different from time critical threads. Because the physical core resources at which background threads locate do not have time critical threads, and the locking mechanism also ensures that time critical threads and background threads will not occupy a same physical core resource, the priority of background threads can be set higher than a normal priority. Correspondingly, background threads and threads included in a background process, which is different from a focus process, may have more opportunity to occupy core resources of a CPU when conducting preemption, so as to obtain the purpose of optimization.

At S307, allocating one predetermined physical core resource of the remaining physical core resources for all threads included in a background process and making the one predetermined physical core resource dedicated to the all threads included in the background process, wherein said background process is created when the predetermined software is running.

In such step, one predetermined physical core resource which is determined from the remaining physical core resources can be allocated for all threads of a background process. For example, the last physical core resource in the remaining physical core resources can be allocated for the all threads. The determination of one specific predetermined physical core resource can be conducted according to actual needs, and no limitation will be made.

Further, said background process and focus process can commonly belong to a predetermined software. Or, said background process can belong to a software, which is not focused currently and is different from the predetermined software to which the focus process belongs.

At S308, setting a priority of the background process and the all threads included in the background process lower than a normal priority. The flow process is ended here.

Further, for all threads included in a background process, steps S307-S308 may not be performed, and the background process may be configured to enter into a dormant state when a predetermined software is running; and a priority of the background process can be set lower than a normal priority. As such, the CPU utilization of a background process can be reduced, so as to ensure that a focus process will obtain more CPU resources. Accordingly, response time of a focus process can be enhanced.

Further, the execution of setting priorities in steps S304, S306 and S308 as well as the execution of other steps do not follow a restricted order. That is, the execution of setting priorities can be arranged before or after the execution of related allocating step, or the execution of setting priorities can be arranged before or after the execution of all allocating steps.

Regarding the situation where the number of physical core resources is more than the number of time critical threads, an Example 1 is set forth below to facilitate explanation.

Following pre-definitions are made at first:

1. Assumed that a current processor has n physical core resources, which are numbered in sequence as: P1, P2, . . . , Pn. Wherein n might be large, and a modern advanced processor can have more than ten physical core resources.

2. Assumed that each physical core resource has m logical cores, and logical core resources in the $i^{th}$ physical core resource can be numbered in sequence as: Li.1, Li.2, . . . , Li.m. Generally, m might be small, and its value can typically be 1 or 2, and no more than 4 in general.

3. Assumed that a focus process that running currently has p time critical threads (TCTs), which are numbered in sequence as: TCT1, TCT2, . . . , TCTp. Generally, p might not be very large in a typical software design, and its value can be 1 or 2, and rarely exceeds 2.

4. Assumed that a focus process that running currently has q background threads (BGTs), which are numbered in sequence as: BGT1, BGT2, . . . , BGTq.

5. Assumed that at least one background process (BGP), apart from the currently running focus process. The BGP and the focus process may belong to a same software, or belong to different ones.

Example 1: regarding the situation where the number of physical core resources is more than the number of time critical threads (i.e. n>p), assumed that a multi-core CPU has 4 physical core resources (i.e. n=4), and each physical core resource has 2 logical core resources (i.e. m=2). In addition, a focus process includes 2 time critical threads TCT1 and TCT2 (i.e. p=2), and the focus process further includes 10 BGTs (i.e. q=10). Apart from the focus process, there are two BGPs running simultaneously.

Figure 4A:
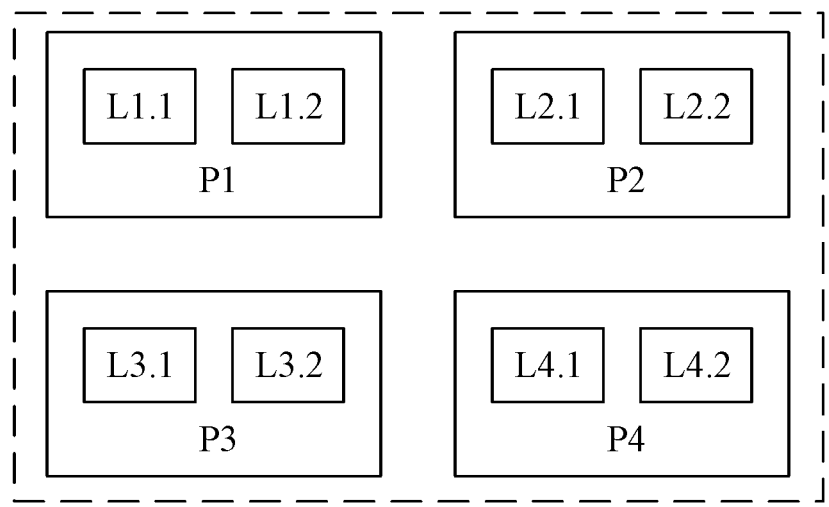
FIGS. 4a-4d are schematic diagrams exemplarily illustrating a method for allocating core resources of a multi-core CPU according to another embodiment of the present disclosure, wherein the number of physical core resources of said CPU is more than the number of time critical threads.

FIGS. 4a-4d are schematic diagrams illustrating a method for allocating core resources according to another embodiment of the present invention, wherein such embodiment corresponds to the situation where the number of physical core resources in a multi-core CPU is more than the number of time critical threads. As shown in FIG. 4a, physical core resources P1-P4, which have not been allocated for TCTs, have corresponding logical core resources L1.1-L1.2, L2.1-L2.2, L3.1-L3.2 and L4.1-L4.2 respectively. Time critical threads TCT1 and TCT2 can exclusively have one physical core resource respectively, by using the method for allocating core resources in a multi-core CPU provided by embodiments of the present invention.

Figure 4B:
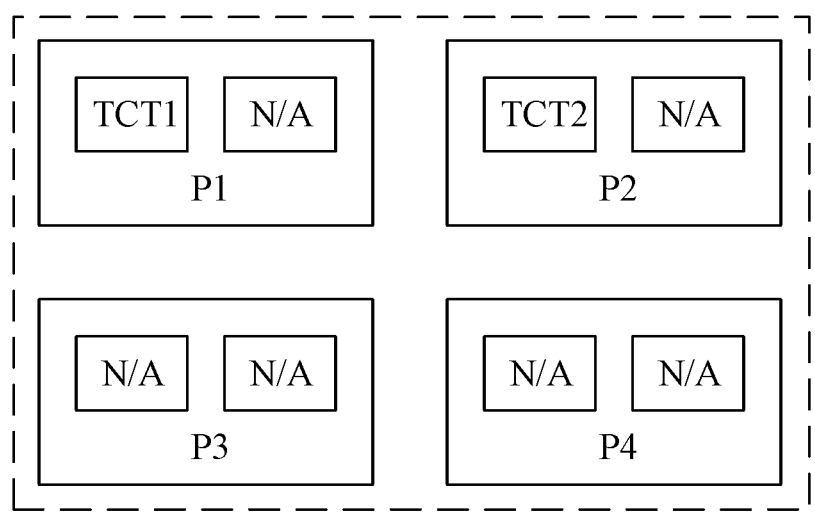

As shown in FIG. 4b, in this example, logical core resource L1.1 of a physical core resource P1 is allocated for TCT1, and logical core resource L2.1 of physical core resource P2 is allocated for TCT2. In addition, TCT1 and TCT2 is locked, that is, TCT1 is restricted to run within L1.1 and TCT2 is restricted to run within L2.1. Logical core resource L1.2 of P1 and logical core resource L2.2 of P2 are not occupied. In other words, L1.2 and L2.2 will not preempt resources with L1.1 and L2.1. TCT1 and TCT2 possess exclusive P1 and P2 respectively, thereby achieving an isolation of physical (P) level. In addition, priorities of a focus process as well as TCT1 and TCT2 can be set higher than a normal priority. When specifically implemented, the allocation of core resources for TCT1 and TCT2 can be conducted based on actual needs according to the principle of the present invention, and no limitation will be made herein.

Figure 4C:
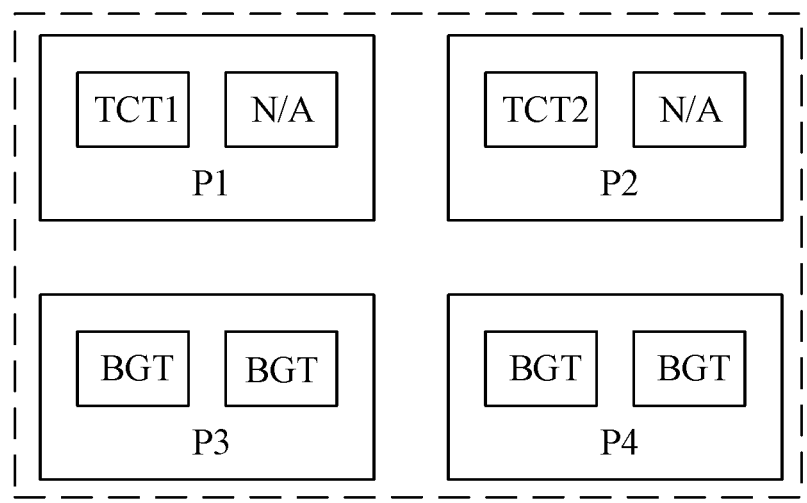

After allocating core resources for TCTs, remaining physical core resources P3 and P4 are still not allocated. As shown in FIG. 4c, both of the remaining physical core resources P3 and P4 can be allocated for the 10 BGTs included in a focus process, and no limitation will be made to the specific allocating manner. In addition, BGTs and TCTs are locked to run within different physical core resources, and thus they will not preempt resources. Accordingly, a priority of the 10 BGTs can be set higher than a normal priority.

Figure 4D:
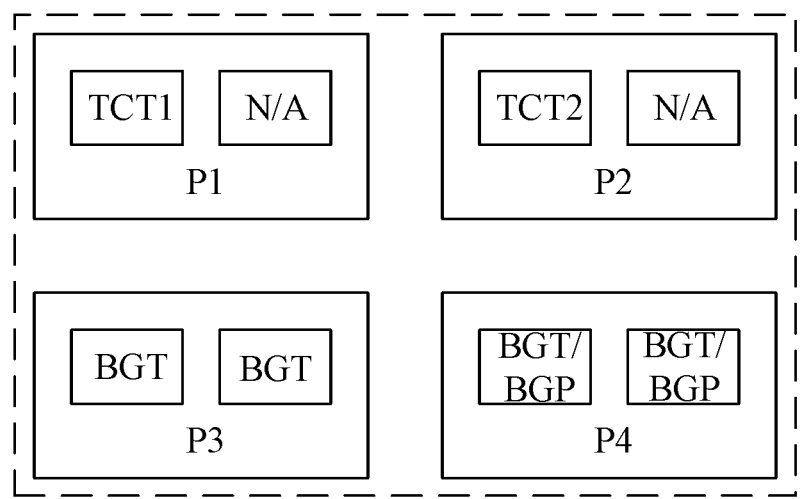

After allocating core resources for threads included in a focus process, as shown in FIG. 4d, core resources can be allocated for BGPs, which are different from a focus process. In this example, the last physical core resource P4 of the remaining physical core resources P3 and P4 is set as a predetermined physical core resource. P4 is allocated for all threads of BGPs, and said all threads are locked within P4. Because there are BGTs of a focus process running in P4, the priority of all threads in BGPs can be set lower than a normal priority. As a result, it's ensured that BGTs of a focus process can preferentially obtain more resources when an operating system is allocating resources, so as to ensure the operation of a focus process and achieve the object of optimization.

In addition, when the number of physical core resources is equal to the number of time critical threads, performing the following steps:

At S309, allocating one physical core resource for each time critical thread respectively, and making the one physical core resource dedicated for each time critical thread.

At S310, setting a priority of the focus process and the time critical threads included in the focus process higher than a normal priority.

At S311, allocating one predetermined physical core resource of said physical core resources for background threads included in the focus process and making the predetermined physical core resource dedicated to the background threads, wherein said background threads are different from the time critical threads; and wherein a first number of said time critical threads occupy exclusively one physical core resource respectively, and the first number is the number of the physical core resources minus one.

In such step, due to that the number of physical core resources is equal to the number of time critical threads, there is no unoccupied core resources left after each time critical thread is allocated with a physical core resource. When allocating physical core resources for background threads, each background thread has to share one physical core resource with a certain time critical thread. However, at least it's assured that a first number of time critical threads exclusively occupy one physical core resource respectively, so as to achieve a maximized balance for allocating resources and reach an optimized effect.

In such step, one predetermined physical core resource, which is determined from the allocated physical core resources, can be allocated for background threads. For example, the last physical core resource in physical core resources can be allocated for those background threads. The specific one predetermined physical core resource can be set according to actual needs, and no limitation shall be made to it.

At S312, setting a priority of the background threads at S311 as a normal priority.

In such step, due to that the background threads share one physical core resource with a certain time critical thread, a priority of background threads can be set lower that the priority of time critical threads, in order to assure that the time critical thread can occupy more resources when preempting resources with background threads.

At S313, allocating one predetermined physical core resource at S311 for all threads included in a background process and making the one predetermined physical core resource dedicated to the all threads, wherein said background process is created while the predetermined software is running.

In such step, the physical core resource that allocated for background threads of a focus process can be allocated for all threads included in a background process. As such, it still can be assured that a first number of time critical threads can exclusively occupy one physical core resource respectively, so as to achieve a maximized balance for allocating resources and reach an optimized effect.

Further, said background process and focus process can commonly belong to a predetermined software. Or, said background process can belong to a software that is not focused currently and is different from the predetermined software to which the focus process belongs.

At S314, setting a priority of the background process and all threads included in the background process at S313 lower than a normal priority. The flow process is ended here.

In steps S310, S312 and S314, priorities of time critical threads included in a focus process, background threads included in a focus process, and all threads included in a background process are set respectively. The priority of time critical threads is highest (higher than a normal priority), the priority of the background threads is relatively lower (the normal priority), and the priority of all threads in a background process is lowest (lower than the normal priority). In such embodiment, due to that there is one physical core resource running time critical threads, background threads, and all threads in a background process simultaneously, the three can obtain different resources, based on different priorities being set, during the preemption of CPU resources. That is, the possibility of swapping out the time critical threads having a highest priority is lowest, even if being swapped out, the possibility of swapping in can be highest; on the other hand, the possibility of swapping out all threads of a background process having a lowest priority is highest, when being swapped out, the possibility of swapping in can be lowest. Accordingly, it can be assured that time critical threads can occupy physical core resources as far as possible, so as to achieve a better optimization.

Further, for all threads included in a background process, steps S313-S314 may not be performed, and the background process may be configured to enter into a dormant state when a predetermined software is running; and a priority of the background process can be set lower than a normal priority. As such, the CPU utilization of a background process can be reduced, so as to ensure that a focus process will obtain more CPU resources. Accordingly, response time of a focus process can be enhanced.

Further, the execution of setting priorities in steps S310, S312 and S314 as well as the execution of other steps do not follow a restricted order. That is, the execution of setting priorities can be arranged before or after the execution of related allocating step, or the execution of setting priorities can be arranged before or after the execution of all allocating steps.

Regarding the situation where the number of physical core resources is equal to the number of time critical threads, an Example 2 is set forth below to facilitate explanation.

Example 2: regarding the situation where the number of physical core resources is equal to the number of time critical threads (i.e. n=p), assumed that a multi-core CPU has 3 physical core resources (i.e. n=3), and each physical core resource has 2 logical core resources (i.e. m=2). In addition, a focus process includes 3 time critical threads TCT1, TCT2 and TCT3 (i.e. p=3), and the focus process further includes 8 BGTs (i.e. q=8). Apart from the focus process, three BGPs are running simultaneously.

Figure 5A:
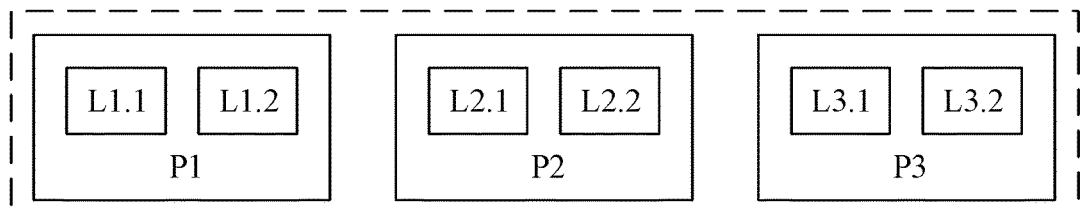
FIGS. 5a-5d are schematic diagrams exemplarily illustrating a method for allocating core resources of a multi-core CPU according to another embodiment of the present disclosure, wherein the number of physical core resources of said CPU is equal to the number of time critical threads.

FIGS. 5a-5d are schematic diagrams illustrating a method for allocating core resources according to another embodiment of the present invention, wherein such embodiment corresponds to the situation where the number of physical core resources in a multi-core CPU is equal to the number of time critical threads. As shown in FIG. 5a, physical core resources P1-P3, which have not been allocated for TCTs, have corresponding logical core resources L1.1-L1.2, L2.1-L2.2, and L3.1-L3.2 respectively. Time critical threads TCT1, TCT2 and TCT3 can exclusively have one physical core resource respectively, by using the method for allocating core resources of a multi-core CPU provided by embodiments of the present invention.

Figure 5B:
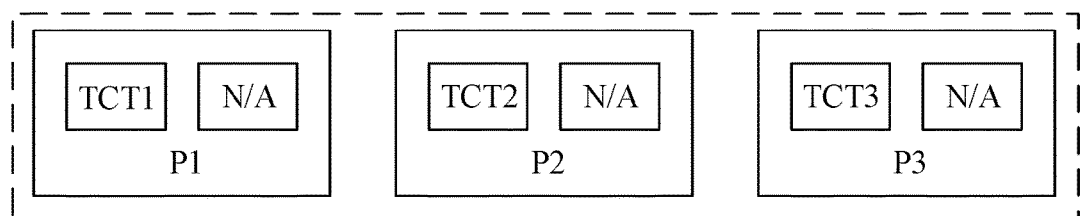

As shown in FIG. 5b, in this example, logical core resource L1.1 of physical core resource P1 is allocated for TCT1, logical core resource L2.1 of physical core resource P2 is allocated for TCT2, and logical core resource L3.1 of physical core resource P3 is allocated for TCT3. In addition, TCT1-TCT3 are locked, that is, TCT1 is restricted to run within L1.1, TCT2 is restricted to run within L2.1, and TCT3 is restricted to run within L3.1. Logical core resource L1.2 of P1, logical core resource L2.2 of P2, and logical core resource L3.2 of P3 are not occupied. In other words, L1.2, L2.2 and L3.2 will not preempt resources with L1.1, L2.1, and L3.1. TCT1, TCT2 and TCT3 possess exclusive P1, P2 and P3 respectively, thereby achieving an isolation of physical (P) level. In addition, priorities of a focus process as well as TCT1, TCT2 and TCT3 can be set higher than a normal priority. When specifically implemented, the allocation of core resources for TCT1, TCT2 and TCT3 can be conducted based on actual needs according to the principle of the present invention, and no limitation will be made herein.

Figure 5C:
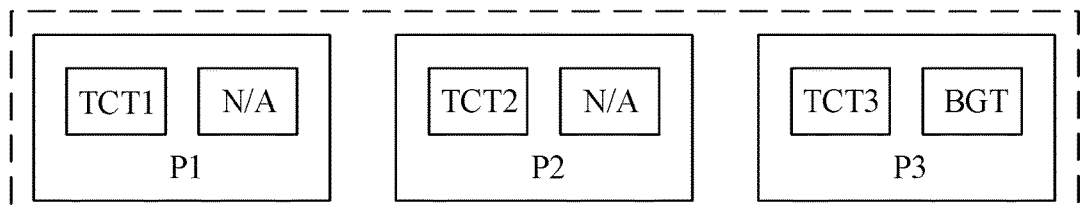

After allocating core resources for TCTs, all physical core resources P1-P3 have been allocated. As shown in FIG. 5c, one predetermined physical core resource, e.g. P3, can be determined from P1-P3, and the predetermined P3 can be allocated for the 8 BGTs included in a focus process. When specifically implemented, any one of P1-P3 can be set as a predetermined physical core resource, and no limitation will be made herein. Due to that both TCT3 and BGTs are locked to run within P3, the priority of the 8 BGTs can be set lower than the priority of TCT3, i.e. set as a normal priority, in order to ensure that TCT3 can preempt enough resources to maintain the running of a focus process.

Figure 5D:
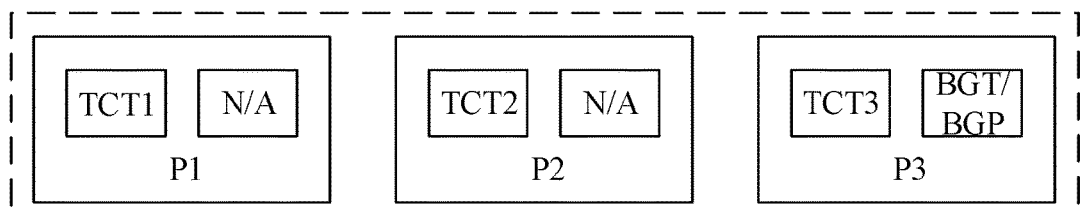

After allocating core resources for threads included in a focus process, as shown in FIG. 5d, core resources can be allocated for BGPs, which are different from a focus process. In this example, P3 is allocated for all threads of BGPs. Because both TCT3 and BGTs of a focus process are running in P3, the priority of all threads in BGPs can be set lower than a normal priority, so as to ensure the operation of a focus process and achieve the object of optimization.

In addition, when the number of physical core resources is less than the number of time critical threads, performing the following steps:

At S315, allocating logical core resources included in a multi-core CPU for the time critical threads and making the allocated logical core resources dedicated to the time critical threads, based on the number of the logical core resources and the number of the time critical threads, so as to maximize the number of the time critical threads that occupy exclusive logical core resources.

In such step, for the situation where the number of physical core resources is less than the number of time critical threads, if core resources are allocated for time critical threads by the manner of making time critical threads exclusively occupy physical core resources, more time critical threads may share one physical core resource to preempt resources, which aggravates the balance of resource allocation. Due to that each logical core resource of a multi-core CPU can run a thread of an operating system independently and concurrently, logical core resources can also provide enough resources for time critical thread. Accordingly, in embodiments of the present invention, the granularity of resource allocation can be reduced, by means of allocating logical core resource. The specific allocating manner is provided in the embodiment below.

Figure 6:
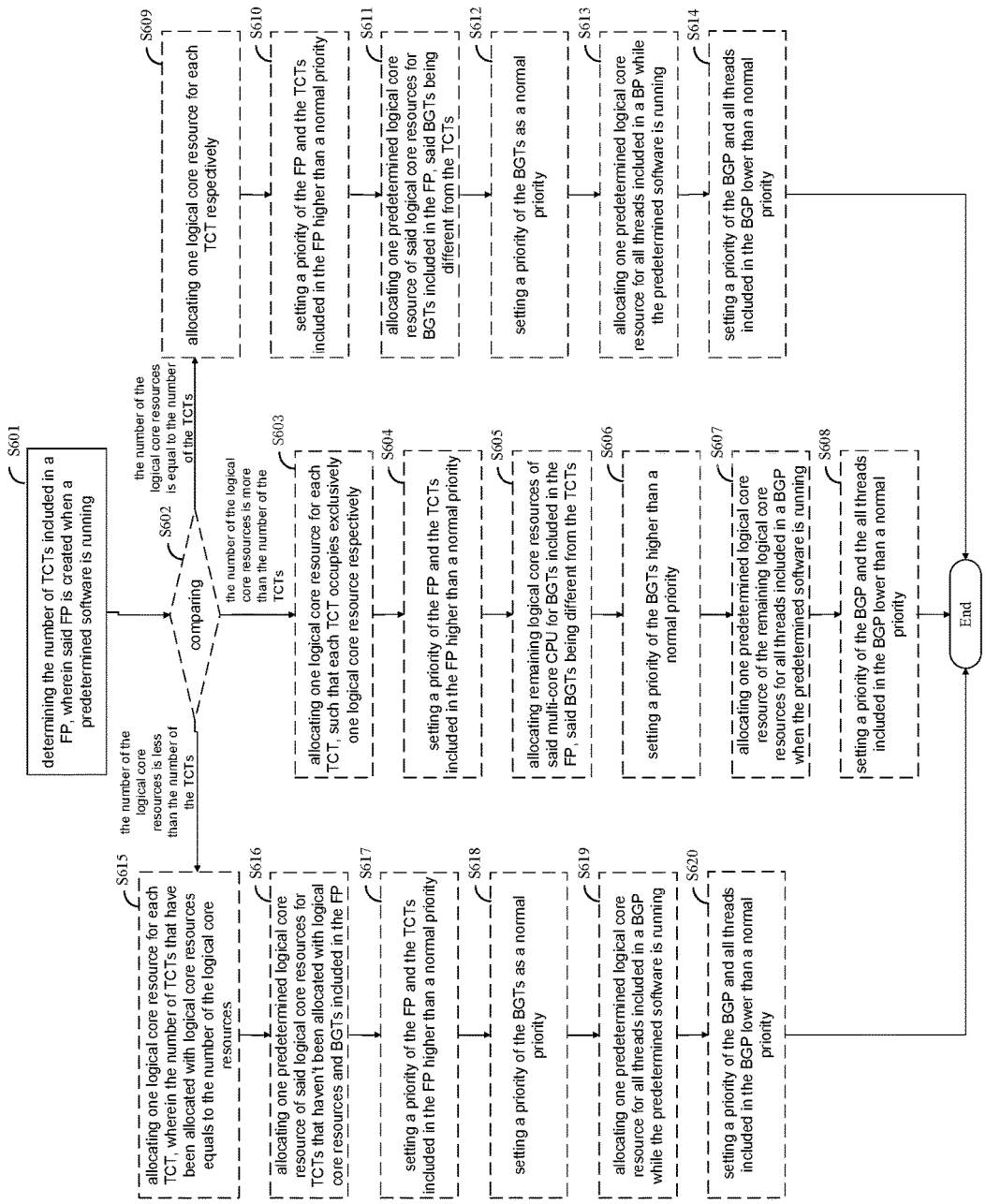
FIG. 6 is a flow diagram exemplarily illustrating a method for allocating core resources of a multi-core CPU according to another embodiment of the present disclosure.

FIG. 6 is a flow diagram illustrating a method for allocating core resources of a multi-core CPU according to another embodiment of the present invention. In this embodiment, in response to that the number of physical core resources is less than the number of time critical threads, allocating logical core resources in a multi-core CPU for the time critical threads. An executing subject may be the terminal 101 in the Application Scenario. A flow process for allocating core resources of a multi-core CPU provided by one embodiment of the present invention is described hereinafter with reference to FIG. 6.

As illustrated in FIG. 6, a method for allocating core resources of a multi-core CPU provided by an embodiment of the present application, comprising:

At S601, determining the number of time critical threads included in a focus process, wherein said focus process is created while a predetermined software is running.

At S602, comparing the number of logical core resources included in the multi-core CPU and the number of said time critical threads. If the number of the logical core resources is more than the number of the time critical threads, it proceeds to S603; if the number of the logical core resources is equal to the number of the time critical threads, it proceeds to step S609; and if the number of the logical core resources is less than the number of the time critical threads, it proceeds to step S615.

Regarding that the number of logical core resources is more than the number of time critical threads, performing the following steps:

At S603, allocating one logical core resource for each time critical thread and making the allocated logical core resources dedicated to each time critical thread, such that each time critical thread occupies exclusively one logical core resource respectively.

At S604, setting a priority of the focus process and the time critical threads included in the focus process higher than a normal priority.

At S605, allocating remaining logical core resources of said multi-core CPU for background threads included in the focus process and making the remaining logical core resources dedicated to the background threads, said background threads being different from the time critical threads, and the remaining logical core resources are those included in the multi-core CPU other than the logical core resources which have been allocated to the time critical threads.

When specifically implemented in the aforesaid step, the allocation can be conducted according to the number of remaining logical core resources. If the number of remaining logical core resources is no less than the number of background threads, each background thread can have one exclusive logical core resource respectively; if the number of remaining logical core resources is less than the number of background threads, background threads can share the remaining logical core resources. No limitation shall be made to the specific allocating manner.

At S606, setting a priority of the background threads at step S605 higher than a normal priority.

In such step, due to that the number of logical core resources is more than the number of time critical threads, each time critical thread can exclusively occupy corresponding logical core resources, and there are some logical core resources left. The remaining logical core resources can be allocated for background threads included in a focus process, wherein the background threads are different from time critical threads. Because the logical core resources at which background threads locate do not have time critical threads, and the locking mechanism also ensures that time critical threads and background threads will not occupy a same logical core resource, the priority of background threads can be set higher than a normal priority. Correspondingly, background threads and threads included in a background process, which is different from a focus process, may have more opportunity to occupy resources of a CPU when conducting preemption, so as to obtain the purpose of optimization.

At S607, allocating one predetermined logical core resource of the remaining logical core resources at S605 for all threads included in a background process and making the one predetermined physical core resource dedicated to the all threads, wherein said background process is created when the predetermined software is running.

In such step, the one predetermined logical core resource which is determined from the remaining logical core resources can be allocated for all threads of a background process. For example, the last logical core resource in the remaining logical core resource can be allocated for the all threads. The determination of one specific predetermined logical core resource can be conducted according to actual needs, and no limitation will be made.

Further, said background process and focus process can commonly belong to a predetermined software. Or, said background process can belong to a software that is not focused currently and is different from the predetermined software to which the focus process belongs.

At S608, setting a priority of the background process and all threads included in the background process at S607 lower than a normal priority. The flow process is ended here.

Further, for all threads included in a background process, steps S607-S608 may not be performed, and the background process may be configured to enter into a dormant state when a predetermined software is running; and a priority of the background process can be set lower than a normal priority. As such, the CPU utilization by a background process can be reduced, so as to ensure that a focus process will obtain more CPU resources. Accordingly, response time of a focus process can be enhanced.

Further, the execution of setting priorities in steps S604, S606 and S608 as well as the execution of other steps do not follow a restricted order. That is, the execution of setting priorities can be arranged before or after the execution of related allocating step, or the execution of setting priorities can be arranged before or after the execution of all allocating steps.

Regarding the situation where the number of logical core resources is more than the number of time critical threads, an Example 3 is set forth below to facilitate explanation.

Example 3: regarding the situation where the number of logical core resources is more than the number of time critical threads (i.e. n×m>p), assumed that a multi-core CPU has 3 physical core resources (i.e. n=3), and each physical core resource has 2 logical core resources (i.e. m=2). In addition, a focus process includes 4 time critical threads TCT1, TCT2, TCT3 and TCT4, i.e. p=4 (n=3<p<n<n×m=6), and the focus process further includes 10 BGTs (i.e. q=10). Apart from the focus process, there are two BGPs running simultaneously.

Figure 7A:
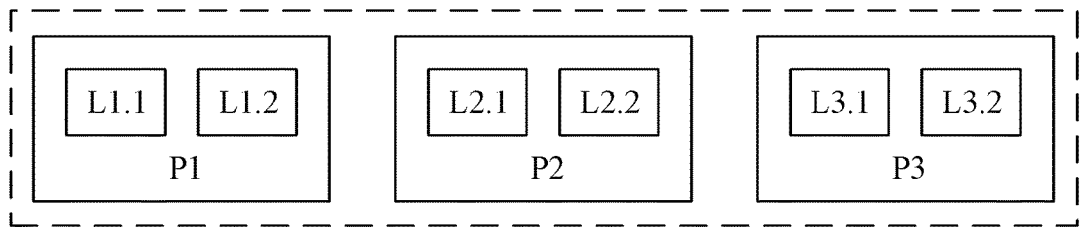
FIGS. 7a-7d are schematic diagrams exemplarily illustrating a method for allocating core resources of a multi-core CPU according to another embodiment of the present disclosure, wherein the number of logical core resources of said CPU is more than the number of time critical threads.

FIGS. 7a-7d are schematic diagrams illustrating a method for allocating core resources according to another embodiment of the present invention, wherein such embodiment corresponds to the situation where the number of logical core resources in a multi-core CPU is more than the number of time critical threads. As shown in FIG. 7a, physical core resources P1-P3, which have not been allocated for TCTs, have corresponding logical core resources L1.1-L1.2, L2.1-L2.2, and L3.1-L3.2 respectively. Time critical threads TCT1-TCT4 can exclusively have one logical core resource respectively, by using the method for allocating core resources in a multi-core CPU provided by embodiments of the present invention.

Figure 7B:
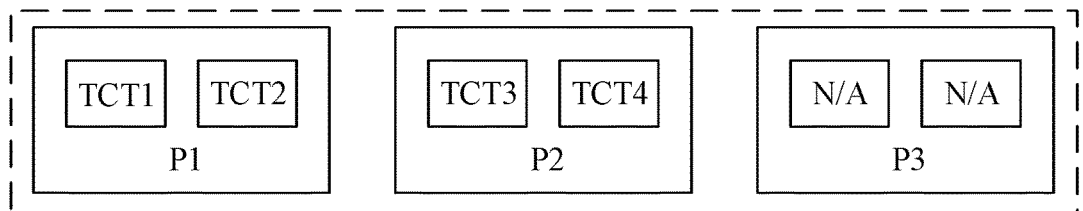

As shown in FIG. 7b, in this example, logical core resource L1.1 of physical core resource P1 is allocated for TCT1, logical core resource L1.2 of physical core resource P1 is allocated for TCT2, and logical core resource L2.1 of physical core resource P2 is allocated for TCT3, and logical core resource L2.2 of physical core resource P2 is allocated for TCT4. In addition, TCT1-TCT4 are locked, that is, TCT1 is restricted to run within L1.1, TCT2 is restricted to run within L1.2, TCT3 is restricted to run within L2.1, and TCT4 is restricted to run within L2.2. Logical core resources L3.1 and L3.2 of P3 are not occupied. That is, TCT1-TCT4 exclusively possess all logical core resources of P1 and P2 respectively, thereby achieving an isolation of logical (L) level. In addition, priorities of a focus process as well as TCT1-TCT4 can be set higher than a normal priority. When specifically implemented, the allocation of logical core resources for TCT1-TCT4 can be conducted based on actual needs according to the principle of the present invention, and no limitation will be made herein.

Figure 7C:
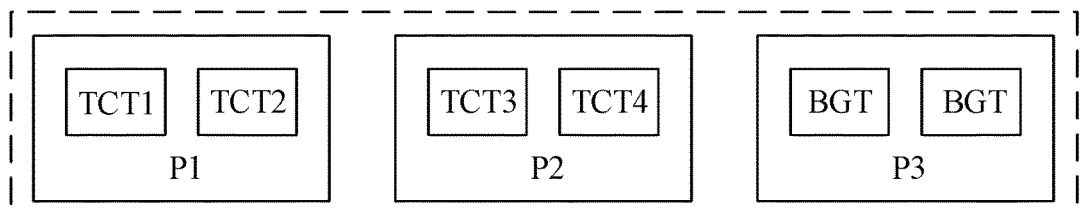

After allocating core resources for TCTs, remaining logical core resources L3.1 and L3.2 are still not allocated. As shown in FIG. 7c, the remaining logical core resources L3.1 and L3.2 can be allocated for the 10 BGTs included in a focus process, and no limitation will be made to the specific allocating manner. In addition, BGTs and TCTs are locked to run within different logical core resources, and thus they will not preempt resources. Accordingly, a priority of the 10 BGTs can be set higher than a normal priority.

Figure 7D:
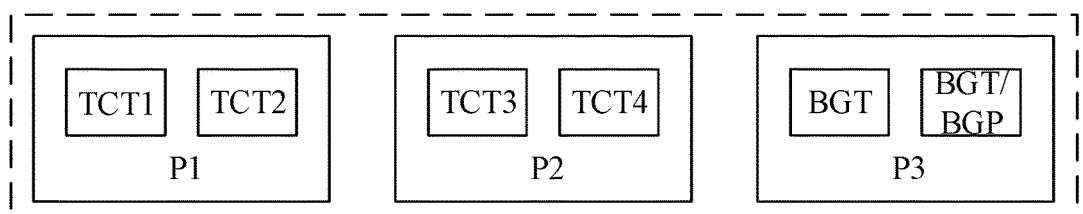

After allocating core resources for threads included in a focus process, as shown in FIG. 7d, core resources can be allocated for BGPs, which are different from a focus process. In this example, the last logical core resource L3.2 of the remaining logical core resources L3.1 and L3.2 is set as a predetermined logical core resource, and L3.2 is allocated for all threads of BGPs, and the all threads are locked within L3.2. Because there are BGTs of a focus process running in L3.2, the priority of all threads in BGPs can be set lower than a normal priority. As a result, it's ensured that BGTs of a focus process can preferentially obtain more resources when an operating system is allocating resources, so as to ensure the operation of a focus process and achieve the object of optimization.

In addition, when the number of logical core resources is equal to the number of time critical threads, performing the following steps:

At S609, allocating one logical core resource for each time critical thread respectively and making the one logical core resource dedicated to each time critical thread.

At S610, setting a priority of the focus process and the time critical threads included in the focus process higher than a normal priority.

At S611, allocating one predetermined logical core resource of said logical core resources for background threads included in the focus process and making the one predetermined logical core resource dedicated to the background threads, said background threads being different from the time critical threads; wherein a second number of the time critical threads occupy exclusively one logical core resource respectively, and the second number is the number of the logical core resources minus one.

In such step, due to that the number of logical core resources is equal to the number of time critical threads, there is no unoccupied logical core resources left after one logical core resource is allocated for each time critical thread. When allocating logical core resources for background threads, background threads have to share one logical core resource with a certain time critical thread. However, at least it's assured that a second number of time critical threads exclusively have one logical core resource, so as to achieve a maximized balance for allocating resources and reach an optimized effect.

In such step, one predetermined logical core resource, which is determined from the allocated logical core resources, can be allocated for background threads. For example, the last logical core resource of logical core resources can be allocated for such background threads. The specific one predetermined logical core resource can be set according to actual needs, and no limitation shall be made to it.

At S612, setting a priority of the background threads at S611 as a normal priority.

In such step, due to that background threads share one logical core resource with a certain time critical thread, the priority of background threads can be set lower than the priority of the time critical thread, in order to assure that time critical threads can occupy more resources when preempting resources with background threads.

At S613, allocating the one predetermined logical core resource at S611 for all threads included in a background process and making the one predetermined logical core resource dedicated to the all threads, wherein said background process is created while the predetermined software is running.

In such step, the logical core resource, which is allocated for background threads of a focus process, can be allocated for all threads included in a background process. As such, it still can be assured that a second number of time critical threads can exclusively occupy one logical core resource respectively, so as to achieve a maximized balance for allocating resources and reach an optimized effect.

Further, said background process and focus process can commonly belong to a predetermined software. Or, said background process can belong to a software that is not focused currently and is different from the predetermined software to which the focus process belongs.

At S614, setting a priority of the background process and all threads included in the background process at S613 lower than a normal priority. The flow process is ended here.

In steps S610, S612 and S614, priorities of time critical threads included in a focus process, background threads included in a focus process, and all threads included in a background process are set respectively. The priority of time critical threads is highest (higher than a normal priority), the priority of background threads is relatively lower (the normal priority), and the priority of all threads in a background process is lowest (lower than the normal priority). In such embodiment, due to that there is one logical core resource running time critical threads, background threads, and all threads in a background process simultaneously, the three can obtain different resources, based on different priorities being set, during the preemption of CPU resources. That is, the possibility of swapping out the time critical threads having a highest priority is lowest, even if being swapped out, the possibility of swapping in can be highest; on the other hand, the possibility of swapping out the all threads of a background process having a lowest priority is highest, when being swapped out, the possibility of swapping in can be lowest. Accordingly, it can be assured that time critical threads can occupy logical core resources as far as possible, so as to achieve a better optimization.

Further, for all threads included in a background process, steps S613-S614 may not be performed, and the background process may be configured to enter into a dormant state when a predetermined software is running; and a priority of the background process can be set lower than a normal priority. As such, the CPU utilization of a background process can be reduced, so as to ensure that a focus process will obtain more CPU resources. Accordingly, response time of a focus process can be enhanced.

Further, the execution of setting priorities in steps S610, S612 and S614 as well as the execution of other steps do not follow a restricted order. That is, the execution of setting priorities can be arranged before or after the execution of related allocating step, or the execution of setting priorities can be arranged before or after the execution of all allocating steps.

Regarding the situation where the number of logical core resources is equal to the number of time critical threads, an Example 4 is set forth below to facilitate explanation.

Example 4: regarding the situation where the number of logical core resources is equal to the number of time critical threads (i.e. n×m=p), assumed that a multi-core CPU has 3 physical core resources (i.e. n=3), and each physical core resource has 2 logical core resources (i.e. m=2). In addition, a focus process includes 6 time critical threads TCT1-TCT6 (i.e. p=6), and the focus process further includes 8 BGTs (i.e. q=8). Apart from the focus process, three BGPs are running simultaneously.

Figure 8A:
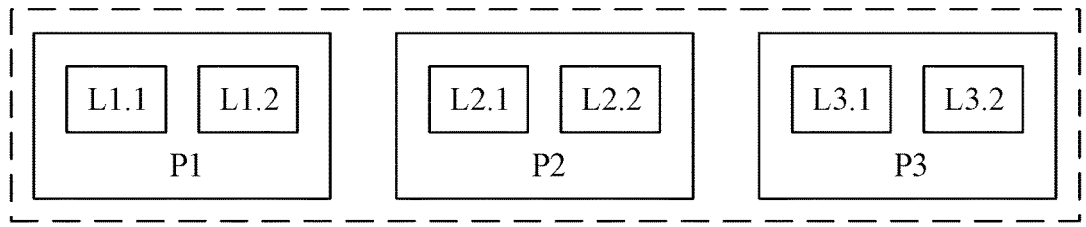
FIGS. 8a-8d are schematic diagrams exemplarily illustrating a method for allocating core resources of a multi-core CPU according to another embodiment of the present disclosure, wherein the number of logical core resources of said CPU is equal to the number of time critical threads.

FIGS. 8a-8d are schematic diagrams illustrating a method for allocating core resources according to another embodiment of the present invention, wherein such embodiment corresponds to the situation where the number of logical core resources in a multi-core CPU is equal to the number of time critical threads. As shown in FIG. 8a, physical core resources P1-P3, which have not been allocated for TCTs, have corresponding logical core resources L1.1-L1.2, L2.1-L2.2, and L3.1-L3.2 respectively. Time critical threads TCT1-TCT6 can exclusively have one logical core resource respectively, by using the method for allocating core resources in a multi-core CPU provided by embodiments of the present invention.

Figure 8B:
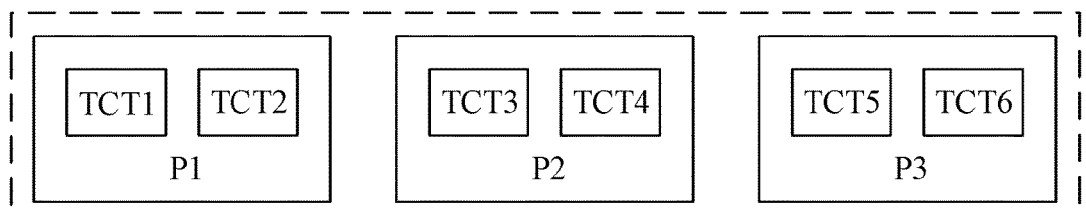

As shown in FIG. 8b, in this example, logical core resource L1.1 of physical core resource P1 is allocated for TCT1, logical core resource L1.2 of physical core resource P1 is allocated for TCT2, logical core resource L2.1 of physical core resource P2 is allocated for TCT3, logical core resource L2.2 of physical core resource P2 is allocated for TCT4, logical core resource L3.1 of physical core resource P3 is allocated for TCT5, logical core resource L3.2 of physical core resource P6 is allocated for TCT6. In addition, TCT1-TCT6 are locked, that is, TCT1 is restricted to run within L1.1, TCT2 is restricted to run within L1.2, TCT3 is restricted to run within L2.1, TCT4 is restricted to run within L2.2, TCT5 is restricted to run within L3.1, and TCT6 is restricted to run within L3.2. In other words, TCT1-TCT6 exclusively possess the logical core resources in P1, P2 and P3 respectively, thereby achieving an isolation of logical (L) level. In addition, priorities of a focus process as well as TCT1-TCT6 can be set higher than a normal priority. When specifically implemented, the allocation of logical core resources for TCT1-TCT6 can be conducted based on actual needs according to the principle of the present invention, and no limitation will be made herein.

Figure 8C:
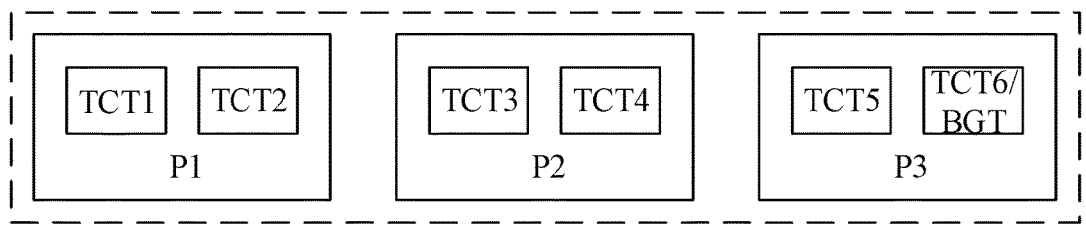

After allocating core resources for TCTs, all logical core resources (L1.1-L3.2) of P1-P3 have been allocated. As shown in FIG. 8c, one predetermined logical core resource, e.g. L3.2, can be determined from L1.1-L3.2, and the predetermined L3.2 can be allocated for the 8 BGTs included in a focus process. When specifically implemented, any one of L1.1-L3.2 can be set as a predetermined physical core resource, and no limitation will be made herein. Due to that both TCT6 and BGTs are locked to run within L3.2, the priority of the 8 BGTs can be set lower than the priority of TCT6, i.e. set as a normal priority, in order to ensure that TCT6 can preempt enough resources to maintain the running of a focus process.

Figure 8D:
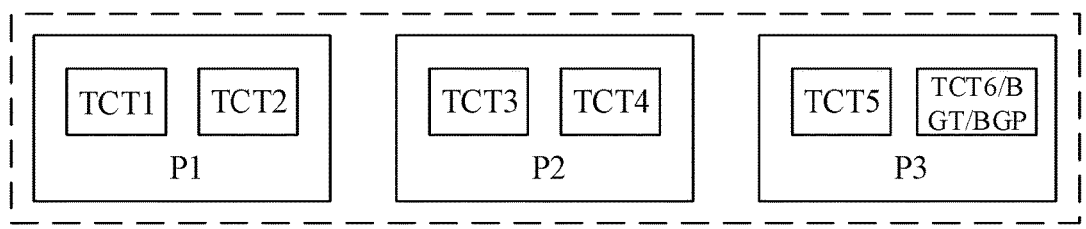

After allocating core resources for threads included in a focus process, as shown in FIG. 8d, core resources can be allocated for BGPs, which are different from a focus process. In this example, L3.2 is allocated for all threads of BGPs. Because there are TCT6 and BGTs of a focus process running in L3.2, the priority of all threads in BGPs can be set lower than a normal priority, so as to ensure the operation of a focus process and achieve the object of optimization.

Further, if the number of logical core resources is less than the number of time critical threads, performing the following steps:

At S615, allocating one logical core resource for each time critical thread and making the allocated logical core resources dedicated to each time critical thread, wherein the number of time critical threads that have been allocated with logical core resources equals to the number of the logical core resources.

In such step, due to that the number of time critical threads is more than the number of logical core resources, the number of time critical threads that have been allocated with logical core resources equals to the number of the logical core resources, such that the number of the time critical threads that occupy exclusive core resources can be maximized. As a result, there are some time critical threads that haven't been allocated with logical core resources, and no unoccupied logical core resources are left.

At S616, allocating one predetermined logical core resource of said logical core resources for both time critical threads that haven't been allocated any core resource and said background threads included in the focus process, and making the one predetermined logical core resource dedicated to both said time critical threads that haven't been allocated any core resource and said background threads included in the focus process, said background threads being different from the time critical threads; and wherein a second number of the time critical threads occupy exclusively one logical core resource respectively, and the second number is the number of the logical core resources minus one.

In such step, in order to make sure that time critical threads can exclusively occupy logical core resources as far as possible, one predetermined logical core resource, which is determined from the allocated logical core resources, can be allocated for background threads, e.g. the last logical core resource in logical core resources. Then, allocating the one predetermined logical core resource for the time critical threads that haven't been allocated with logical core resources, as well as for the background threads, so as to allow a second number of time critical threads exclusively occupy one logical core resource respectively. The specific one predetermined logical core resource can be set according to actual needs, and no limitation shall be made to it.

At S617, setting a priority of the focus process and the time critical threads included in the focus process higher than a normal priority.

At S618, setting a priority of the background threads at S616 as a normal priority.

At S619, allocating the one predetermined logical core resource at S616 for all threads included in a background process and making the one predetermined logical core resource dedicated to the all threads included in said background process, wherein said background process is created when the predetermined software is running.

Further, said background process and focus process can commonly belong to a predetermined software. Or, said background process can belong to a software that is not focused currently and is different from the predetermined software to which the focus process belongs.

At S620, setting a priority of the background process and all threads included in the background process at S619 lower than a normal priority.

In steps S617, S618 and S620, priorities of time critical threads included in a focus process, background threads included in a focus process, and all threads included in a background process are set respectively. In such embodiment, due to that there is one logical core resource running at least two time critical threads, background threads, and all threads in a background process simultaneously, the three can obtain different resources to realize an optimized effect, based on different priorities being set, during the preemption of CPU resources.

Further, for all threads included in a background process, steps S619-S620 may not be performed, and the background process may be configured to enter into a dormant state when a predetermined software is running; and a priority of the background process can be set lower than a normal priority. As such, the CPU utilization of a background process can be reduced, so as to ensure that a focus process will obtain more CPU resources. Accordingly, response time of a focus process can be enhanced.

Further, the execution of setting priorities in steps S617, S618 and S620 as well as the execution of other steps do not follow a restricted order. That is, the execution of setting priorities can be arranged before or after the execution of related allocating step, or the execution of setting priorities can be arranged before or after the execution of all allocating steps.

Regarding the situation where the number of logical core resources is less than the number of time critical threads, an Example 5 is set forth below to facilitate explanation.

Example 5: regarding the situation where the number of logical core resources is less than the number of time critical threads (i.e. n×m<p), assumed that a multi-core CPU has 3 physical core resources (i.e. n=3), and each physical core resource has 2 logical core resources (i.e. m=2). In addition, a focus process includes 7 time critical threads TCT1-TCT7 (i.e. p=7), and the focus process further includes 8 BGTs (i.e. q=8). Apart from the focus process, three BGPs are running simultaneously.

Figure 9A:
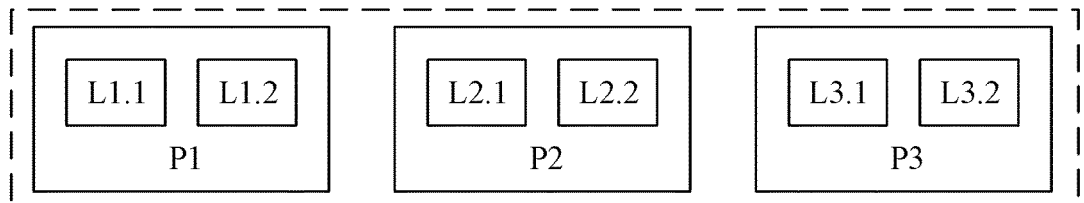
FIGS. 9a-9d are schematic diagrams exemplarily illustrating a method for allocating core resources of a multi-core CPU according to another embodiment of the present disclosure, wherein the number of logical core resources of said CPU is less than the number of time critical threads.

FIGS. 9a-9d are schematic diagrams illustrating a method for allocating core resources according to another embodiment of the present invention, wherein such embodiment corresponds to the situation where the number of logical core resources in a multi-core CPU is less than the number of time critical threads. As shown in FIG. 9a, physical core resources P1-P3, which have not been allocated for TCTs, have corresponding logical core resources L1.1-L1.2, L2.1-L2.2, and L3.1-L3.2 respectively. Any six of time critical threads TCT1-TCT7 can exclusively have one logical core resource respectively, by using the method for allocating core resources in a multi-core CPU provided by embodiments of the present invention. The specific allocating manner can be determined according to actual needs, and no limitation shall be made herein. In this embodiment, it's assumed that TCT1-TCT6 exclusively have one logical core resource respectively.

Figure 9B:
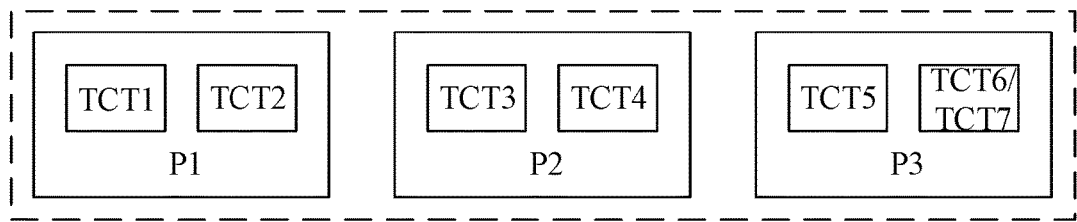

As shown in FIG. 9b, in this example, logical core resource L1.1 of physical core resource P1 is allocated for TCT1, logical core resource L1.2 of physical core resource P1 is allocated for TCT2, logical core resource L2.1 of physical core resource P2 is allocated for TCT3, logical core resource L2.2 of physical core resource P2 is allocated for TCT4, logical core resource L3.1 of physical core resource P3 is allocated for TCT5, logical core resource L3.2 of physical core resource P6 is allocated for TCT6. In addition, TCT1-TCT6 are locked, that is, TCT1 is restricted to run within L1.1, TCT2 is restricted to run within L1.2, TCT3 is restricted to run within L2.1, TCT4 is restricted to run within L2.2, TCT5 is restricted to run within L3.1, and TCT6 is restricted to run within L3.2. In other words, TCT1-TCT6 exclusively possess the logical core resources in P1, P2 and P3 respectively, thereby achieving an isolation of logical (L) level. At this time, all logical core resources (L1.1-L3.2) of P1-P3 have been allocated. In addition, one predetermined logical core resource, e.g. L3.2, which is determined from L1.1-L3.2, can be allocated for the TCT7 which has not been allocated any core resources. When specifically implemented, any one of L1.1-L3.2 can be set as a predetermined physical core resource, and no limitation will be made herein. In addition, priorities of a focus process as well as TCT1-TCT7 can be set higher than a normal priority. When specifically implemented, the allocation of logical core resources for TCT1-TCT7 can be conducted based on actual needs according to the principle of the present invention, and no limitation will be made herein.

Figure 9C:
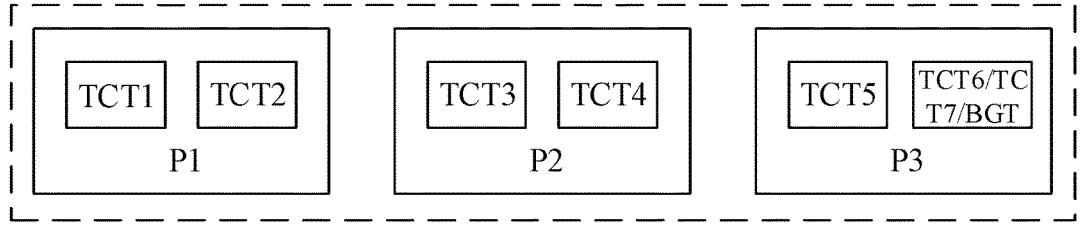

After allocating core resources for TCTs, as shown in FIG. 9c, the predetermined L3.2 can be allocated for the 8 BGTs included in a focus process. Due to that all of TCT6, TCT7 and BGTs are locked to run within L3.2, the priority of the 8 BGTs can be set lower than the priority of TCT6 and TCT7, i.e. set as a normal priority, in order to ensure that TCT6 and TCT7 can preempt enough resources to maintain the running of a focus process.

Figure 9D:
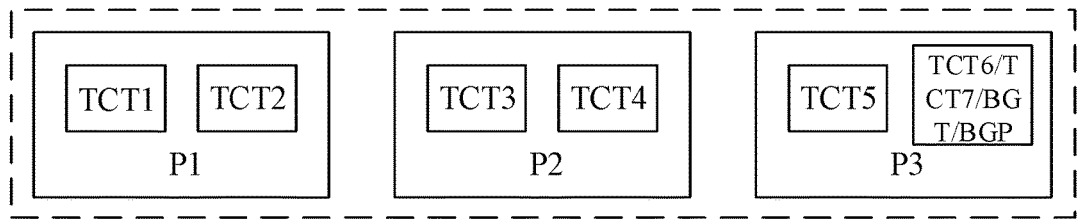

After allocating core resources for threads included in a focus process, as shown in FIG. 9d, core resources can be allocated for BGPs, which are different from a focus process. In this example, L3.2 is allocated for all threads of BGPs. Because there are TCT6, TCT7 and BGTs of a focus process running in L3.2, the priority of all threads in BGPs can be set lower than a normal priority, so as to ensure the operation of a focus process and achieve the object of optimization.

Figure 10:
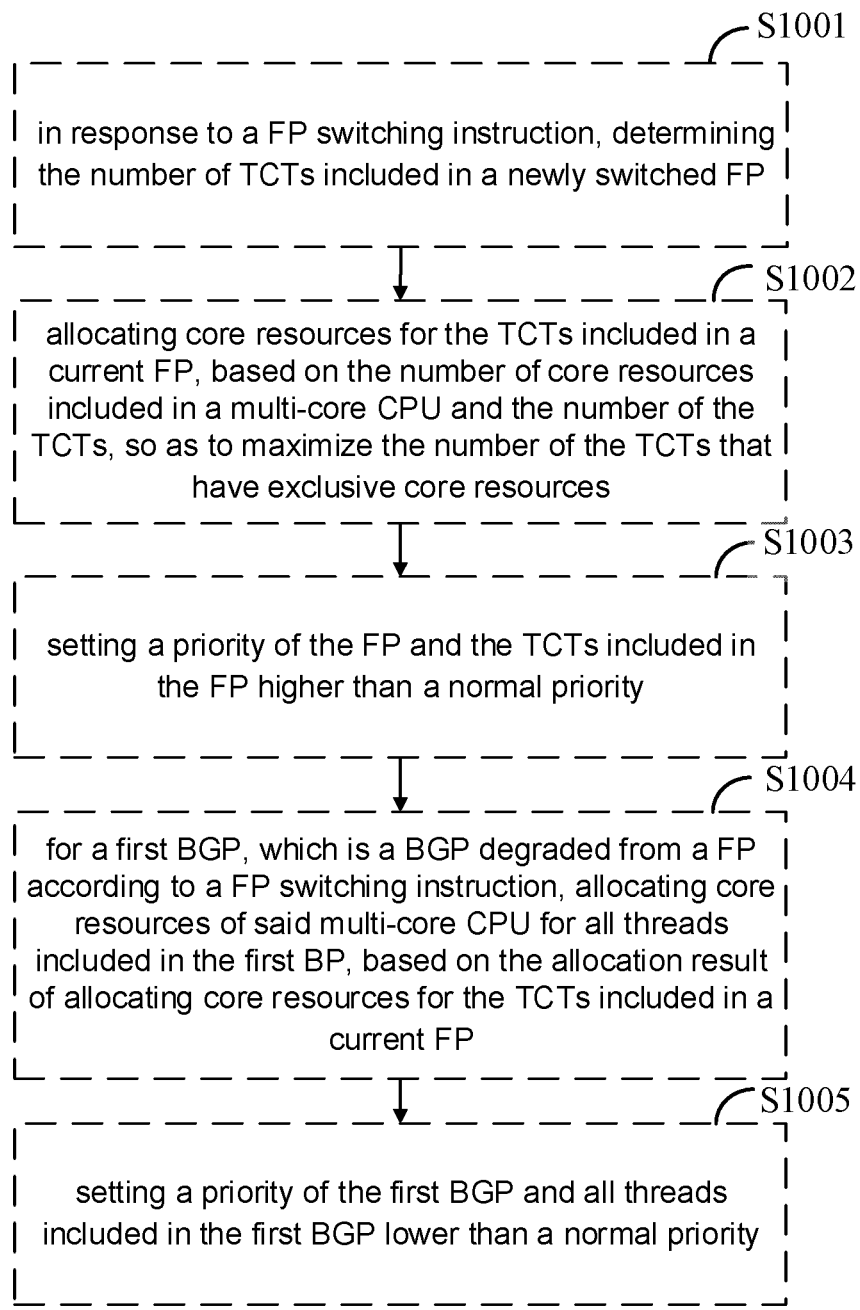
FIG. 10 is a flow diagram exemplarily illustrating a method for allocating core resources of a multi-core CPU according to yet another embodiment of the present disclosure.

FIG. 10 is a flow diagram illustrating a method for allocating core resources of a multi-core CPU according to yet another embodiment of the present invention. In such embodiment, providing a method of allocating core resources of a multi-core CPU for a new focus process, when a user switches a current focus process (i.e. one background process is changed to a new current focus process, and a previous focus process is degraded to a background process). An executing subject may be the terminal 101 in the Application Scenario. A flow process for allocating core resources of a multi-core CPU provided by one embodiment of the present invention is described hereinafter with reference to FIG. 10.

As shown in FIG. 10, a method for allocating core resources of a multi-core CPU provided by an embodiment of the present application, comprising:

At S1001, in response to a focus process switching instruction, determining the number of time critical threads included in a newly switched focus process.

In such step, a terminal may run multiple software simultaneously, or run multiple instances of a software simultaneously. When a user replaces a software being currently processed, or replaces a copy of a software being currently processed according to usage requirements, i.e. degrading a current focus process to a background process and upgrading a background process to a current focus process, a process switching instruction sent by a user is determined as received.

At S1002, allocating core resources included in a multi-core CPU for time critical threads included in a current focus process and making the allocated core resources dedicated to the time critical threads, based on the number of the core resources and the number of the time critical threads, so as to maximize the number of the time critical threads that occupy exclusive core resources.

The executing manner of such step may refer to the methods for allocating core resources provided in the embodiments of the present invention. That is:

in response to that the number of the physical core resources is no less than the number of the time critical threads included in a switched focus process, allocating the physical core resources for the time critical threads and making the allocated physical core resources dedicated to the time critical threads, so as to maximize the number of the time critical threads that occupy exclusive physical core resources;

in response to that the number of the physical core resources is less than the number of the time critical threads, allocating logical core resources included in the multi-core CPU for the time critical threads and making the allocated logical core resources dedicated to the time critical threads, based on the number of the logical core resources and the number of the time critical threads, so as to maximize the number of the time critical threads that have exclusive logical core resources.

At S1003, setting a priority of the focus process and the time critical threads included in the focus process higher than a normal priority.

At S1004, for a first background process, which is a background process degraded from a focus process according to a focus process switching instruction at S1001, allocating core resources of said multi-core CPU for all threads included in the first background process and making the allocated core resources dedicated to the all threads, based on the allocation result of allocating core resources for time critical threads included in the current focus process.

In such step, the previous focus process is currently a background process (the first background process), the method of allocating core resources for the first background process may refer to the embodiments provided by the present invention, and no discussion will be made any more.

At S1005, setting a priority of the first background process and all threads included in the first background process lower than a normal priority.

Further, for all threads included in the first background process, steps S1004-S1005 may not be performed, and the first background process may be configured to enter into a dormant state when a predetermined software is running; and a priority of the first background process can be set lower than a normal priority. As such, the CPU utilization of the first background process can be reduced, so as to ensure that a new current focus process will obtain more CPU resources. Accordingly, response time of the new current focus process can be enhanced.

In such embodiment, the rule of allocating core resources of a multi-core CPU provided in the present invention can be applied to different running software, or different copies or processes of a running software. When a user replaces a current focus process, the scheduling can be made in real time, and the allocation strategy of CPU core resources can be adjusted according to such rule, so as to ensure that a current focus process is running at an optimized status all the time.

Exemplary Device

After the methods according to embodiments of the present invention have been introduced, a device for allocating core resources according to embodiments of the present invention will be described with reference to FIG. 11.

Figure 11:
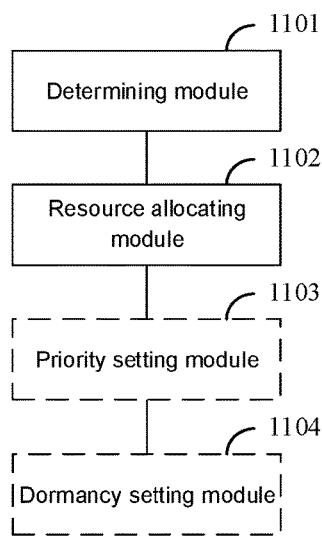
FIG. 11 is a structure diagram exemplarily illustrating a device for allocating core resources of a multi-core CPU according to an embodiment of the present disclosure.

FIG. 11 is a schematic diagram illustrating a device for allocating core resources of a multi-core CPU according to an embodiment of the present invention. As shown in FIG. 11, the device comprises the following modules: a determining module 1101 for determining the number of time critical threads included in a focus process, wherein said focus process is created when a predetermined software is running; a resource allocating module 1102 for allocating the core resources for the time critical threads and making the core resources dedicated to the time critical threads, based on the number of core resources included in the multi-core CPU and the number of the time critical threads, so as to maximize the number of the time critical threads that occupy exclusive core resources.

Alternatively, in some embodiments, the device further comprises: a priority setting module 1103 for setting a priority of the focus process and time critical threads included in the focus process higher than a normal priority.

Alternatively, in other embodiments, the resource allocating module 1102 can be specifically used for comparing the number of physical core resources included in the multi-core CPU and the number of said time critical threads. In response to that the number of the physical core resources is no less than the number of the time critical threads, allocating the physical core resources for the time critical threads and making the allocated physical core resources dedicated to the time critical threads, so as to maximize the number of the time critical threads that occupy exclusive physical core resources; and in response to that the number of the physical core resources is less than the number of the time critical threads, allocating logical core resources included in the multi-core CPU for the time critical threads and making the allocated logical core resources dedicated to the time critical threads, based on the number of the logical core resources and the number of the time critical threads, so as to maximize the number of the time critical threads that occupy exclusive logical core resources.

Alternatively, in some other embodiments, the resource allocating module 1102 is specifically used for: in response to that the number of the physical core resources included in the multi-core CPU is more than the number of the time critical threads, allocating one physical core resource for each time critical thread and making the allocated one physical core resource dedicated to each time critical thread, such that each time critical thread occupies exclusively one physical core resource respectively; and allocating remaining physical core resources of said multi-core CPU for background threads included in the focus process and making the physical core resources dedicated to the background threads, said background threads being different from the time critical threads and the remaining physical core resources are those included in the multi-core CPU but other than the physical core resources which have been allocated to the time critical threads.

Alternatively, in some other embodiments, the device further comprises: a priority setting module 1103 for setting a priority of the background threads higher than a normal priority.

Alternatively, the resource allocating module 1102 is further used for allocating one predetermined physical core resource of the remaining physical core resources for all threads included in a background process and making the one predetermined physical core resource dedicated to the all threads included in the background process, wherein said background process is created when the predetermined software is running; and the priority setting module 1103 is used for setting a priority of the background process and the all threads included in the background process lower than a normal priority.

Alternatively, in some other embodiments, the resource allocating module 1102 is specifically used for: in response to that the number of the physical core resources is equal to the number of the time critical threads, allocating one physical core resource for each time critical thread respectively and making the one physical core resource dedicated to each time critical thread; allocating one predetermined physical core resource of said physical core resources for background threads included in the focus process and making the predetermined physical core resource dedicated to the background threads, wherein said background threads are different from the time critical threads; and wherein a first number of said time critical threads occupy exclusively one physical core resource respectively, and the first number is the number of the physical core resources minus one.

Alternatively, in some other embodiments, the device further comprises: a priority setting module for setting a priority of the background threads as a normal priority.

Alternatively, in some other embodiments, the resource allocating module 1102 is further used for allocating one predetermined physical core resource for all threads included in a background process and making the one predetermined physical core resource dedicated to the all threads, wherein said background process is created while the predetermined software is running; and the priority setting module 1103 is used for setting a priority of the background process and all threads included in the background process lower than a normal priority.

Alternatively, in some other embodiments, the resource allocating module 1102 can be specifically used for comparing the number of logical core resources included in the multi-core CPU and the number of said time critical threads. In response to that the number of the logical core resources is more than the number of the time critical threads, allocating one logical core resource for each time critical thread and making the allocated logical core resources dedicated to each time critical thread, such that each time critical thread occupies exclusively one logical core resource respectively; and allocating remaining logical core resources of said multi-core CPU for background threads included in the focus process and making the remaining logical core resources dedicated to the background threads, said background threads being different from the time critical threads, and the remaining logical core resources are those included in the multi-core CPU other than the logical core resources which have been allocated to the time critical threads.

Alternatively, in some other embodiments, the device further comprises: a priority setting module 1103 for setting a priority of the background threads higher than a normal priority.

Alternatively, the resource allocating module 1102 is further used for allocating one predetermined logical core resource of the remaining logical core resources for all threads included in a background process and making the one predetermined physical core resource dedicated to the all threads, wherein said background process is created when the predetermined software is running; and the priority setting module 1103 is used for setting a priority of the background process and the all threads included in the background process lower than a normal priority.

Alternatively, in some other embodiments, the resource allocating module 1102 is specifically used for: in response to that the number of the logical core resources is equal to the number of the time critical threads, allocating one logical core resource for each time critical thread respectively and making the one logical core resource dedicated to each time critical thread; allocating one predetermined logical core resource of said logical core resources for background threads included in the focus process and making the one predetermined logical core resource dedicated to the background threads, said background threads being different from the time critical threads; and wherein a second number of the time critical threads occupy exclusively one logical core resource respectively, and the second number is the number of the logical core resources minus one.

Alternatively, in some other embodiments, the device further comprises: a priority setting module 1103 for setting a priority of the background threads as a normal priority.

Alternatively, in some other embodiments, the resource allocating module 1102 is further used for allocating one predetermined logical core resource for all threads included in a background process and making the one predetermined logical core resource dedicated to the all threads, wherein said background process is created while the predetermined software is running; and the priority setting module 1103 is used for setting a priority of the background process and all threads included in the background process lower than a normal priority.

Alternatively, in some other embodiments, the resource allocating module 1102 is further used for: in response to that the number of the logical core resources is less than the number of the time critical threads, allocating one logical core resource for each time critical thread and making the allocated logical core resources dedicated to each time critical thread, wherein the number of time critical threads that have been allocated with logical core resources equals to the number of the logical core resources; allocating one predetermined logical core resource of said logical core resources for both time critical threads that haven't been allocated any core resource and said background threads included in the focus process, and making the one predetermined logical core resource dedicated to both said time critical threads that haven't been allocated any core resource and said background threads included in the focus process, said background threads being different from the time critical threads; and a second number of the time critical threads occupy exclusively one logical core resource respectively, and the second number is the number of the logical core resources minus one.

Alternatively, in some other embodiments, the device further comprises: a priority setting module 1103 for setting a priority of the background threads as a normal priority.

Alternatively, in some other embodiments, the resource allocating module 1102 is further used for allocating one predetermined logical core resource for all threads included in a background process and making the one predetermined logical core resource dedicated to the all threads included in said background process, wherein said background process is created when the predetermined software is running; and the priority setting module 1103 is used for setting a priority of the background process and all threads included in the background process lower than a normal priority.

Alternatively, in some other embodiments, the device further comprises: a dormancy setting module 1104 for setting a background process into a dormant state when the predetermined software is running; and a priority setting module 1103 for setting the priority of the background process lower than a normal priority.

Alternatively, in some other embodiments, the determining module 1101 is further used for: in response to an instruction used for switching focus processes, determining the number of time critical threads included in the current focus process being changed. The resource allocating module 1102 is further used for: allocating core resources included in a multi-core CPU for the time critical threads and making the allocated core resources dedicated to the time critical threads, based on the number of core resources and the number of the time critical threads in the current focus process, so as to maximize the number of the time critical threads that have exclusive core resources.

Alternatively, in some other embodiments, the device further comprises: a priority setting module 1102 for setting a priority of the current focus process and the time critical threads included in the current focus process higher than a normal priority.

Alternatively, in some other embodiments, for a first background process which is degraded from a focus process by the focus process changing instruction, allocating core resources of a multi-core CPU for all threads included in the first background process and making the core resources dedicated to the all threads, based on the allocating result of allocating core resources for time critical threads included in a current focus process.

Alternatively, in some other embodiments, the device further comprises a priority setting module 1102 for setting a priority of the first background process and all threads included in the first background process lower than a normal priority.

Alternatively, in some other embodiments, the device further comprises: a dormancy setting module 1104 for setting the first background process into a dormant state; and a priority setting module 1103 for setting the priority of the first background process lower than a normal priority.

After methods and devices according to some embodiments of the present invention are introduced, a device for allocating core resources of a multi-core CPU according to other embodiments of the present invention is further provided.

It is appreciated by a person skilled in the art that, aspects of the present invention can be embodied as a system, a method or a program product. Therefore, various aspects of the present invention can be realized in hardware, software, or a combination thereof, which generally can be called as "circuit", "module", or "system".

In some embodiments, the device for allocating core resources according to the present invention at least includes: at least one processing unit and at least one storage unit. In an embodiment, the storage unit stores program code. When program code is processed by the processing unit, the processing unit will process the steps included in the method of allocating core resources of a multi-core CPU according to embodiments of present invention as described in "Exampled Method". For example, the processing unit can process the step realized by step S201 as illustrated in FIG. 2: determining the number of time critical threads included in a focus process, wherein said focus process is created when a predetermined software is running; the step realized by step S202: allocating core resources for the time critical threads, based on the number of core resources included in a multi-core CPU and the number of the time critical threads determined in S201, so as to maximize the number of the time critical threads that have exclusive core resources.

A device 120 for allocating core resources of a multi-core CPU according to one embodiment of the present invention is described hereinafter with reference to FIG. 12. The device 120 shown in FIG. 12 is merely illustrative, and brings no limitation on functions and scopes of embodiments of the present invention.

Figure 12:
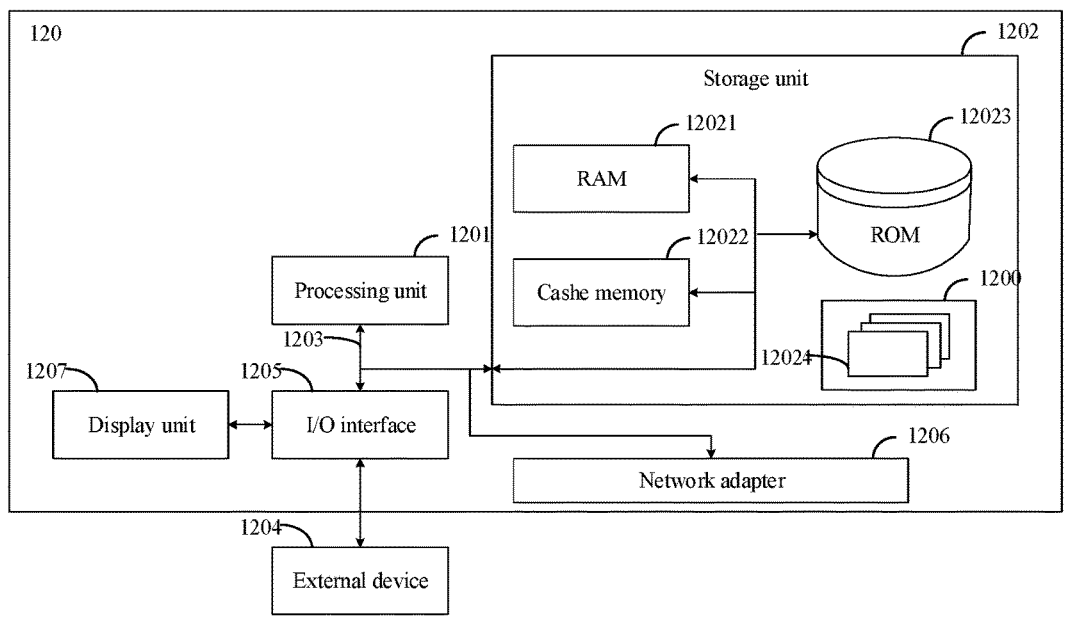
FIG. 12 is a structure diagram exemplarily illustrating a device for allocating core resources of a multi-core CPU according to another embodiment of the present disclosure.

As shown in FIG. 12, the device 120 for allocating core resources of a multi-core CPU can be represented as a general purpose computing device. Components of the device 120 includes but not limited to: said at least one processing unit 1201, said at least one storage unit 1202, a bus 1203 connecting different system components (including the processing unit 1201 and storage unit 1202).

The bus 1203 represents one or more of several types of bus structures, including a memory bus or memory controller, a peripheral bus, a graphics acceleration port, a processor, or a local bus using any of a variety of bus structures.

The storage unit 1202 may comprise a readable medium in the form of a volatile memory, such as a random access memory (RAM) 12021 and/or a cache memory 12022, and further, a read only memory (ROM) 12023.

The storage unit 1202 may also include a program/utility tool 1200 having a set of (at least one) program modules 12024, which includes but not limited to, an operating system, one or more application programs, other program modules and program data. Each of these examples or combinations thereof may include an implementation of the network environment.

The device 120 may also communicate with one or more external devices 1204, such as a keyboard, pointing device, Bluetooth device, etc., and may also communicate with one or more devices that enable a user to communicate with the device 120, and/or any device (e.g., a router, a modem, etc.) that enables the device 120 to communicate with one or more other computing devices. Such communication may be performed through an input/output (I/O) interface 1205. Also, the device 120 may also communicate via a network adapter 1206 with one or more networks, such as a local area network (LAN), a wide area network (WAN), and/or a public network e.g. the Internet. As shown, the network adapter 1206 communicates with other modules of the device 120 of a CPU core resource over bus 1203. The device 120 may also display the resource allocation to a user through a display unit 1207. It should be appreciated that, although not shown in the figures, other hardware and/or software modules may be used in conjunction with a CPU core resource allocation device 120, including, but not limited to, microcode, a device driver, a redundant processing unit, an external disk drive array, a RAID system, a tape drive, and a data backup storage system etc.

Exemplary Program Product

In some embodiments, various aspects of the present invention may also be embodied in the form of a program product e.g. program code. When a program produce is running on a terminal device, the program code may cause the device to process the steps included in the method of allocating core resources of a multi-core CPU according to embodiments of present invention as described in "Exampled Method". For example, the processing unit can process the step realized by step S201 as illustrated in FIG. 2: determining the number of time critical threads included in a focus process, wherein said focus process is created when a predetermined software is running; the step realized by step S202: allocating core resources for the time critical threads and making the allocated core resources dedicated to the time critical threads, based on the number of core resources included in a multi-core CPU and the number of the time critical threads determined in S201, so as to maximize the number of the time critical threads that have exclusive core resources.

The program product may employ any combination of one or more readable media. A readable medium may be a readable signal medium or a readable storage medium. A readable storage medium may be, but not limited to, an electrical, magnetic, optical, electromagnetic, infrared, or semiconductor system, apparatus or device, or any combination thereof. A more specific example (a non-exhaustive list) of a readable storage medium includes an electrical connection having one or more wires, a portable disk, a hard disk, a random access memory (RAM), a read only memory (ROM) (EPROM or flash memory), an optical fiber, a portable compact disk read only memory (CD-ROM), an optical storage device, a magnetic storage device, or any suitable combination thereof.

Figure 13:
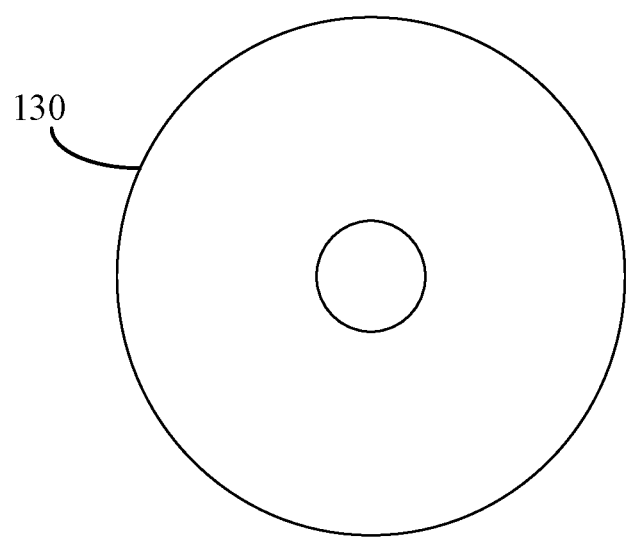
FIG. 13 is a schematic diagram of a program product exemplarily illustrating a device for allocating core resources of a multi-core CPU according to an embodiment of the present disclosure.

As shown in FIG. 13, a program product 130 for a method of allocating core resources of a multi-core resource according to an embodiment of the present invention is described. The program product 130 may employ a portable compact disk read only memory (CD-ROM), and may include program code. In addition, the program product 130 may be run on a terminal device, such as a personal computer. However, the program product of the present invention is not limited to such embodiments. In the present application, a readable storage medium may be any tangible medium that contains or stores a program that can be used by or in connection with an instruction execution system, apparatus, or device.

A readable signal medium may comprise a data signal that is propagated in or as part of a carrier, and the readable signal medium carries readable program code. Such propagated data signal may take a variety of forms, including but not limited to, an electromagnetic signal, an optical signal, or any suitable combination thereof. A readable signal medium may also be any readable medium other than a readable storage medium, and such readable medium may send, propagate, or transmit a program for use by or in connection with an instruction executing system, apparatus, or device.

Program codes included in a readable medium may be transmitted by any suitable medium, including but not limited to, wireless or wired mediums, optical cables, RF etc., or any suitable combination thereof. Program codes for performing the operations of the present invention may be programmed by any combination of one or more programming languages, including object-oriented programming languages such as Java, C++ etc., and conventional procedural programming languages such as "C" language or other similar programming languages. The program code may be executed entirely on a user computing device, partially on a user device, as a standalone software package, partly on a user computing device and partly on a remote computing device, or entirely on a remote computing device or server. In the case of a remote computing device, the remote computing device may be connected to a user computing device through any kind of networks, including a local area network (LAN) or a wide area network (WAN), or may be connected to an external computing device (e.g., connected via the Internet using Internet Service Providers).

It should be noted that, although a number of devices or sub-devices of a CPU core resource allocation device are mentioned in the detailed description above, this division is not mandatory. Indeed, the features and functions of the two or more devices described above may be embodied in one device in accordance with an embodiment of the present invention. Conversely, the features and functions of the one device described above can be further divided into a plurality of devices.

In addition, although the operation of the method of the present invention is described in a specific order in the drawings, this does not require or imply that these operations must be performed in that particular order, or that all of the operations shown must be performed to achieve the desired result. Additionally or alternatively, some steps may be omitted, a plurality of steps may be combined into one step, and/or one step may be decomposed into multiple steps for execution.

While the spirit and principle of the present invention have been described with reference to a number of specific embodiments, it is to be understood that the invention is not limited to the specific embodiments disclosed. The division of aspects does not imply that features in these aspects cannot be combined to achieve benefits. The division is only for the convenience of expression. It is intended that the present invention cover the modifications and equivalent arrangements included within the spirit and scope of the appended claims.

The invention claimed is:

1. A method for allocating core resources of a multi-core CPU, comprising:
   determining a number of time critical threads included in a focus process, wherein said focus process is created when a predetermined software is running; and
   allocating core resources for time critical threads and making the time critical threads locked to the allocated core resources, based on a number of core resources included in the multi-core CPU and the number of the time critical threads, so as to maximize the number of the time critical threads that occupy exclusive core resources;
   wherein the step of allocating the core resources for the time critical threads and making the time critical threads locked to the allocated core resources based on the number of core resources included in the multi-core CPU and the number of the time critical threads so as to maximize the number of the time critical threads that occupy exclusive core resources comprises:
      comparing a number of physical core resources included in the multi-core CPU and the number of said time critical threads;
      in response to that the number of the physical core resources is no less than the number of the time critical threads, allocating the physical core resources for the time critical threads and making the time critical threads locked to the allocated physical core resources, so as to maximize the number of the time critical threads that occupy exclusive physical core resources; and
      in response to that the number of the physical core resources is less than the number of the time critical threads, allocating logical core resources included in the multi-core CPU for the time critical threads and making the time critical threads locked to the allocated logical core resources based on a number of the logical core resources and the number of the time critical threads, so as to maximize the number of the time critical threads that occupy exclusive logical core resources.

2. The method of claim 1, further comprising:
   setting a priority of the focus process and the time critical threads included in the focus process higher than a normal priority.

3. The method of claim 1, wherein the step of in response to that the number of the physical core resources is no less than the number of the time critical threads, allocating the physical core resources for the time critical threads and making the time critical threads locked to the physical core resources comprises:
   in response to that the number of the physical core resources included in the multi-core CPU is more than the number of the time critical threads, allocating one physical core resource for each of the time critical threads and making each of the time critical threads locked to the corresponding one physical core resource, such that each of the time critical threads occupies exclusively one physical core resource respectively; and
   allocating remaining physical core resources of said multi-core CPU for background threads included in the focus process and making the background threads locked to the physical core resources, said background threads being different from the time critical threads and the remaining physical core resources are those included in the multi-core CPU but other than the physical core resources which have been allocated to the time critical threads.

4. The method of claim 3, further comprising:
   setting a priority of the background threads higher than a normal priority.

5. The method of claim 3, further comprising:
   allocating one predetermined physical core resource of the remaining physical core resources for all threads included in a background process and making all the threads included in the background process locked to the one predetermined physical core resource, wherein said background process is created when the predetermined software is running; and setting a priority of the background process and all threads included in the background process lower than a normal priority.

6. The method of claim 1, wherein the step of in response to that the number of the physical core resources is no less than the number of the time critical threads, allocating the physical core resources for the time critical threads and making the time critical threads locked to the physical core resources comprises:

in response to that the number of the physical core resources is equal to the number of the time critical threads, allocating one physical core resource for each of the time critical threads respectively and making each of the time critical threads locked to the corresponding one physical core resource;

allocating one predetermined physical core resource of said physical core resources for background threads included in the focus process and making the background threads locked to the one predetermined physical core resource, wherein said background threads are different from the time critical threads; and wherein a first number of said time critical threads occupy exclusively one physical core resource respectively, and the first number is the number of the physical core resources minus one.

7. The method of claim 6, further comprising:
setting a priority of the background threads as a normal priority.

8. The method of claim 6, further comprising:
allocating one predetermined physical core resource for all threads included in a background process and making all the threads locked to the one predetermined physical core resource, wherein said background process is created while the predetermined software is running; and setting a priority of the background process and all threads included in the background process lower than a normal priority.

9. The method of claim 1, wherein the step of allocating logical core resources included in the multi-core CPU for the time critical threads and making the time critical threads locked to the allocated logical core resources based on the number of the logical core resources and the number of the time critical threads, comprises:

comparing the number of logical core resources included in the multi-core CPU and the number of said time critical threads;

in response to that the number of the logical core resources is more than the number of the time critical threads, allocating one logical core resource for each of the time critical threads and making each of the time critical threads locked to the corresponding one logical core resource, such that each of the time critical threads occupies exclusively one logical core resource respectively; and allocating remaining logical core resources of said multi-core CPU for background threads included in the focus process and making the background threads locked to the remaining logical core resources, said background threads being different from the time critical threads, and the remaining logical core resources are those included in the multi-core CPU other than the logical core resources which have been allocated to the time critical threads.

10. The method of claim 9, further comprising:
allocating one predetermined logical core resource of the remaining logical core resources for all threads included in a background process and making all the threads locked to the one predetermined logical core resource, wherein said background process is created when the predetermined software is running; and setting a priority of the background process and all threads included in the background process lower than a normal priority.

11. The method of claim 1, wherein the step of allocating logical core resources included in the multi-core CPU for the time critical threads and making the time critical threads locked to the allocated logical core resources based on the number of the logical core resources and the number of the time critical threads, comprises:

comparing the number of logical core resources included in the multi-core CPU and the number of said time critical threads;

in response to that the number of the logical core resources is equal to the number of the time critical threads, allocating one logical core resource for each of the time critical threads respectively and making each of the time critical threads locked to the corresponding one logical core resource;

allocating one predetermined logical core resource of said logical core resources for background threads included in the focus process and making the background threads locked to the one predetermined logical core resource, said background threads being different from the time critical threads; and wherein a second number of the time critical threads occupy exclusively one logical core resource respectively, and the second number is the number of the logical core resources minus one.

12. The method of claim 11, further comprising:
allocating one predetermined logical core resource for all threads included in a background process and making all the threads locked to the one predetermined logical core resource, wherein said background process is created while the predetermined software is running; and setting a priority of the background process and all threads included in the background process lower than a normal priority.

13. The method of claim 1, wherein the step of allocating logical core resources included in the multi-core CPU for the time critical threads and making the time critical threads locked to the allocated logical core resources based on the number of the logical core resources and the number of the time critical threads, comprises:

comparing the number of logical core resources included in the multi-core CPU and the number of said time critical threads;

in response to that the number of the logical core resources is less than the number of the time critical threads, allocating one logical core resource for each of the time critical threads and making each of the time critical threads locked to the corresponding one logical core resource, wherein the number of time critical threads that have been allocated with logical core resources equals to the number of logical core resources;

allocating one predetermined logical core resource of said logical core resources for both time critical threads that have not been allocated any core resource and said background threads included in the focus process, and making both said time critical threads that have not been allocated any core resource and said background threads included in the focus process locked to the one predetermined logical core resource, said background threads being different from the time critical threads; and wherein a second number of the time critical threads occupy exclusively one logical core resource respectively, and the second number is the number of the logical core resources minus one.

14. The method of claim 13, further comprising:

allocating one predetermined logical core resource for all threads included in a background process and making all the threads included in said background process locked to the one predetermined logical core resource, wherein said background process is created when the predetermined software is running; and setting a priority of the background process and all threads included in the background process lower than a normal priority.

15. A device for allocating core resources of a multi-core CPU, comprising:

a determining module for determining a number of time critical threads included in a focus process, wherein said focus process is created when a predetermined software is running; and a resource allocating module for allocating core resources for time critical threads and making the time critical threads locked to the allocated core resources, based on a number of core resources included in the multi-core CPU and the number of the time critical threads, so as to maximize the number of the time critical threads that occupy exclusive core resources;

wherein the resource allocating module is configured to:

compare a number of physical core resources included in the multi-core CPU and the number of said time critical threads;

in response to that the number of the physical core resources is no less than the number of the time critical threads, allocate the physical core resources for the time critical threads and make the time critical threads locked to the allocated physical core resources, so as to maximize the number of the time critical threads that occupy exclusive physical core resources; and in response to that the number of the physical core resources is less than the number of the time critical threads, allocate logical core resources included in the multi-core CPU for the time critical threads and make the time critical threads locked to the allocated logical core resources based on a number of the logical core resources and the number of the time critical threads, so as to maximize the number of the time critical threads that occupy exclusive logical core resources.

16. A non-transitory computer readable storage medium for storing a program of instructions executable by a computer to perform a process, the process comprising:

determining a number of time critical threads included in a focus process, wherein said focus process is created when a predetermined software is running; and allocating core resources for time critical threads and making the time critical threads locked to the allocated core resources, based on a number of core resources included in the multi-core CPU and the number of the time critical threads, so as to maximize the number of the time critical threads that occupy exclusive core resources;

wherein the step of allocating the core resources for the time critical threads and making the time critical threads locked to the allocated core resources based on the number of core resources included in the multi-core CPU and the number of the time critical threads so as to maximize the number of the time critical threads that occupy exclusive core resources comprises:

comparing a number of physical core resources included in the multi-core CPU and the number of said time critical threads;

in response to that the number of the physical core resources is no less than the number of the time critical threads, allocating the physical core resources for the time critical threads and making the time critical threads locked to the allocated physical core resources, so as to maximize the number of the time critical threads that occupy exclusive physical core resources; and in response to that the number of the physical core resources is less than the number of the time critical threads, allocating logical core resources included in the multi-core CPU for the time critical threads and making the time critical threads locked to the allocated logical core resources based on a number of the logical core resources and the number of the time critical threads, so as to maximize the number of the time critical threads that occupy exclusive logical core resources.

\* \* \* \* \*